(12) United States Patent
Bhardwaj et al.

(10) Patent No.: US 11,553,534 B2
(45) Date of Patent: Jan. 10, 2023

(54) HANDLING COLLISIONS DUE TO MULTIPLE RADIO RESOURCE CONTROL (RRC) CONNECTION REQUESTS

(71) Applicant: QUALCOMM Incorporated, San Diego, CA (US)

(72) Inventors: Ashish Bhardwaj, San Diego, CA (US); Liangchi Hsu, San Diego, CA (US); Sohrab Ahmad, Hyderabad (IN); Raghuveer Ramakrishna Srinivas Tarimala, Hyderabad (IN); Manjunatha Subbamma Ananda, Hyderabad (IN); Utsav Sinha, Hyderabad (IN); Kavinkadhirselvan Angappan, San Diego, CA (US); Bhanu Kiran Janga, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/032,434

(22) Filed: Sep. 25, 2020

(65) Prior Publication Data

US 2021/0100040 A1 Apr. 1, 2021

(30) Foreign Application Priority Data

Sep. 27, 2019 (IN) .............................. 201941039171

(51) Int. Cl.
*H04W 74/08* (2009.01)
*H04W 76/27* (2018.01)
*H04L 1/18* (2006.01)

(52) U.S. Cl.
CPC .......... *H04W 74/0833* (2013.01); *H04L 1/18* (2013.01); *H04W 76/27* (2018.02)

(58) Field of Classification Search
CPC ............ H04W 76/36; H04W 72/0413; H04W 72/042; H04W 72/0493; H04W 72/14; H04W 76/27; H04W 88/14; H04W 76/19; H04W 72/1289; H04W 72/0406; H04W 74/0833; H04W 76/10; H04W 60/02;
(Continued)

(56) References Cited

U.S. PATENT DOCUMENTS

| 2009/0190572 A1* | 7/2009 | Chang | ................. | H04W 74/006 370/350 |
| 2010/0099402 A1* | 4/2010 | Wu | ........................ | H04W 76/18 455/423 |

(Continued)

FOREIGN PATENT DOCUMENTS

EP 2398282 A1 12/2011

OTHER PUBLICATIONS

IEEE: A Study of the Radio Resource Control Connection Re-establishment Procedure on the UE side in 3GPP. Jeong-Hwan Lee, Ki Soon Sung, SookYang Kang and Jaewook; Jul. 2015 (Year: 2015).*

(Continued)

*Primary Examiner* — Mohammed S Chowdhury
(74) *Attorney, Agent, or Firm* — Muncy, Geissler, Olds & Lowe, P.C./Qualcomm Incorporated

(57) ABSTRACT

Disclosed are techniques for handling collisions between multiple radio resource control (RRC) connection establishment procedures for multiple connection events, such as mobile terminating pages and tracking area updates.

50 Claims, 15 Drawing Sheets

(58) Field of Classification Search
CPC .. H04W 68/005; H04L 5/0044; H04L 5/0094; H04L 1/18; H04L 1/08
See application file for complete search history.

(56) References Cited

U.S. PATENT DOCUMENTS

| | | | |
|---|---|---|---|
| 2013/0035084 A1* | 2/2013 | Song | H04W 52/367 455/418 |
| 2013/0039287 A1* | 2/2013 | Rayavarapu | H04W 72/042 370/329 |
| 2016/0212782 A1* | 7/2016 | Ko | H04W 60/04 |
| 2017/0078907 A1* | 3/2017 | Wu | H04L 5/0048 |
| 2018/0041925 A1* | 2/2018 | Yilmaz | H04W 36/0033 |
| 2020/0178343 A1* | 6/2020 | Kim | H04W 76/14 |
| 2021/0360503 A1* | 11/2021 | Lu | H04W 36/36 |

OTHER PUBLICATIONS

CATT: "The Collision Handling of Paging for CSFB Procedure", 3GPP Draft, 3GPP TSG CT WG1 Meeting #58, C1-092118, 3rd Generation Partnership Project (3GPP), Mobile Competence Centre, 650, Route Des Lucioles, F-06921 Sophia-Antipolis Cedex, France, No. Sophia Antipolis (France), Apr. 27, 2009, Apr. 27, 2009 (Apr. 27, 2009), XP050337650, 6 Pages, [retrieved on Apr. 27, 2009], the whole document.

CATT: "The Collison Handling for Extended Service Request", 3GPP Draft, 3GPP TSG CT WG1 Meeting #58, C1-091599, 3rd Generation Partnership Project (3GPP), Mobile Competence Centre, 650, Route Des Lucioles, F-06921 Sophia-Antipolis Cedex, France, No. Sophia Antipolis (France), Apr. 27, 2009, Apr. 27, 2009 (Apr. 27, 2009), XP050337223, 4 Pages, [retrieved on Apr. 27, 2009], the whole document.

International Search Report and Written Opinion—PCT/US2020/053101—ISAEPO—dated Dec. 15, 2020.

* cited by examiner

User Plane Protocol Stack

Control Plane Protocol Stack

HANDLING COLLISIONS DUE TO MULTIPLE RADIO RESOURCE CONTROL (RRC) CONNECTION REQUESTS

CROSS-REFERENCE TO RELATED APPLICATIONS

The present Application for Patent claims priority under 35 U.S.C. § 119 to Indian Patent Application No. 201941039171, entitled "HANDLING COLLISIONS DUE TO MULTIPLE RADIO RESOURCE CONTROL (RRC) CONNECTION REQUESTS," filed Sep. 27, 2019, which is assigned to the assignee hereof and expressly incorporated herein by reference in its entirety.

BACKGROUND OF THE DISCLOSURE

1. Field of the Disclosure

The present disclosure relates generally to wireless communications systems.

2. Background of the Related Art

The Internet is a global system of interconnected computers and computer networks that use a standard Internet protocol suite (e.g., the transmission control protocol (TCP) and Internet protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect of the disclosure includes a method of wireless communication performed by a user equipment (UE), including: performing a first radio resource control (RRC) connection establishment procedure for a first connection event; detecting a trigger to initiate a second RRC connection establishment procedure for a second connection event, wherein the trigger occurs during performance of the first RRC connection establishment procedure; responsive to the first RRC connection establishment procedure completing successfully, ignoring the trigger to initiate the second RRC connection establishment procedure; and, responsive to the first RRC connection establishment procedure failing, performing the second RRC connection establishment procedure.

An aspect of the disclosure includes a method of wireless communication performed by a UE, including: performing a first RRC connection establishment procedure for a first connection event; detecting a trigger to initiate a second RRC connection establishment procedure for a second connection event, wherein the trigger occurs during performance of the first RRC connection establishment procedure; storing a request to perform the second RRC connection establishment procedure in a buffer until completion of the first RRC connection establishment procedure; responsive to the first RRC connection establishment procedure completing successfully, performing a tracking area update (TAU) using an RRC connection established by the first RRC connection establishment procedure; and responsive to the first RRC connection establishment procedure failing, performing the second RRC connection establishment procedure.

An aspect of the disclosure includes a method of wireless communication performed by a UE, including: performing a first RRC connection establishment procedure for a first connection event; detecting a trigger to initiate a second RRC connection establishment procedure for a second connection event, wherein the trigger occurs during performance of the first RRC connection establishment procedure; storing a request to perform the first RRC connection establishment procedure in a buffer until completion of the second RRC connection establishment procedure; performing the second RRC connection establishment procedure; and performing the first RRC connection establishment procedure after completion of the second RRC connection establishment procedure.

An aspect of the disclosure includes a UE, including: a memory UE; at least one transceiver; and at least one processor communicatively coupled to the memory and the at least one transceiver, the at least one processor configured to: perform a first RRC connection establishment procedure for a first connection event; detect a trigger to initiate a second RRC connection establishment procedure for a second connection event, wherein the trigger occurs during performance of the first RRC connection establishment procedure; ignore, responsive to the first RRC connection establishment procedure completing successfully, the trigger to initiate the second RRC connection establishment procedure; and perform, responsive to the first RRC connection establishment procedure failing, the second RRC connection establishment procedure.

An aspect of the disclosure includes a UE, including: a memory; at least one transceiver; and at least one processor communicatively coupled to the memory and the at least one transceiver, the at least one processor configured to: perform a first RRC connection establishment procedure for a first connection event; detect a trigger to initiate a second RRC connection establishment procedure for a second connection event, wherein the trigger occurs during performance of the first RRC connection establishment procedure; store a request to perform the second RRC connection establishment procedure in a buffer until completion of the first RRC connection establishment procedure; perform, responsive to the first RRC connection establishment procedure completing successfully, a TAU using an RRC connection established by the first RRC connection establishment procedure; and perform, responsive to the first RRC connection establishment procedure failing, the second RRC connection establishment procedure.

An aspect of the disclosure includes a UE, including: a memory; at least one transceiver; and at least one processor communicatively coupled to the memory and the at least one transceiver, the at least one processor configured to: perform a first RRC connection establishment procedure for a first connection event; detect a trigger to initiate a second RRC connection establishment procedure for a second connection event, wherein the trigger occurs during performance of the first RRC connection establishment procedure; store a request to perform the first RRC connection establishment procedure in a buffer until completion of the second RRC connection establishment procedure; perform the second RRC connection establishment procedure; and perform the first RRC connection establishment procedure after completion of the second RRC connection establishment procedure.

An aspect of the disclosure includes an apparatus for wireless communication, including: means for performing a first RRC connection establishment procedure for a first connection event; means for detecting a trigger to initiate a second RRC connection establishment procedure for a second connection event, wherein the trigger occurs during performance of the first RRC connection establishment procedure; means for ignoring, responsive to the first RRC connection establishment procedure completing successfully, the trigger to initiate the second RRC connection establishment procedure; and means for performing, responsive to the first RRC connection establishment procedure failing, the second RRC connection establishment procedure.

An aspect of the disclosure includes an apparatus for wireless communication, including: means for performing a first RRC connection establishment procedure for a first connection event; means for detecting a trigger to initiate a second RRC connection establishment procedure for a second connection event, wherein the trigger occurs during performance of the first RRC connection establishment procedure; means for storing a request to perform the second RRC connection establishment procedure in a buffer until completion of the first RRC connection establishment procedure; means for performing, responsive to the first RRC connection establishment procedure completing successfully, a TAU using an RRC connection established by the first RRC connection establishment procedure; and means for performing, responsive to the first RRC connection establishment procedure failing, the second RRC connection establishment procedure.

An aspect of the disclosure includes an apparatus for wireless communication, including: means for performing a first RRC connection establishment procedure for a first connection event; means for detecting a trigger to initiate a second RRC connection establishment procedure for a second connection event, wherein the trigger occurs during performance of the first RRC connection establishment procedure; means for storing a request to perform the first RRC connection establishment procedure in a buffer until completion of the second RRC connection establishment procedure; means for performing the second RRC connection establishment procedure; and means for performing the first RRC connection establishment procedure after completion of the second RRC connection establishment procedure.

An aspect of the disclosure includes a non-transitory computer-readable medium storing computer-executable instructions, the computer-executable instructions including: at least one instruction instructing a UE to perform a first RRC connection establishment procedure for a first connection event; at least one instruction instructing the UE to detect a trigger to initiate a second RRC connection establishment procedure for a second connection event, wherein the trigger occurs during performance of the first RRC connection establishment procedure; at least one instruction instructing the UE to ignore, responsive to the first RRC connection establishment procedure completing successfully, the trigger to initiate the second RRC connection establishment procedure; and at least one instruction instructing the UE to perform, responsive to the first RRC connection establishment procedure failing, the second RRC connection establishment procedure.

An aspect of the disclosure includes a non-transitory computer-readable medium storing computer-executable instructions, the computer-executable instructions including: at least one instruction instructing a UE to perform a first RRC connection establishment procedure for a first connection event; at least one instruction instructing the UE to detect a trigger to initiate a second RRC connection establishment procedure for a second connection event, wherein the trigger occurs during performance of the first RRC connection establishment procedure; at least one instruction instructing the UE to store a request to perform the second RRC connection establishment procedure in a buffer until completion of the first RRC connection establishment procedure; at least one instruction instructing the UE to perform, responsive to completion of the first RRC connection establishment procedure completing successfully, performing a TAU using an RRC connection established by the first RRC connection establishment procedure; and at least one instruction instructing the UE to perform, responsive to the first RRC connection establishment procedure failing, the second RRC connection establishment procedure.

An aspect of the disclosure includes a non-transitory computer-readable medium storing computer-executable instructions, the computer-executable instructions including: at least one instruction instructing a UE to perform a first RRC connection establishment procedure for a first connection event; at least one instruction instructing the UE to detect a trigger to initiate a second RRC connection establishment procedure for a second connection event, wherein the trigger occurs during performance of the first RRC connection establishment procedure; at least one instruction instructing the UE to store a request to perform the first RRC connection establishment procedure in a buffer until completion of the second RRC connection establishment procedure; at least one instruction instructing the UE to perform the second RRC connection establishment procedure; and at least one instruction instructing the UE to perform the first RRC connection establishment procedure after completion of the second RRC connection establishment procedure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
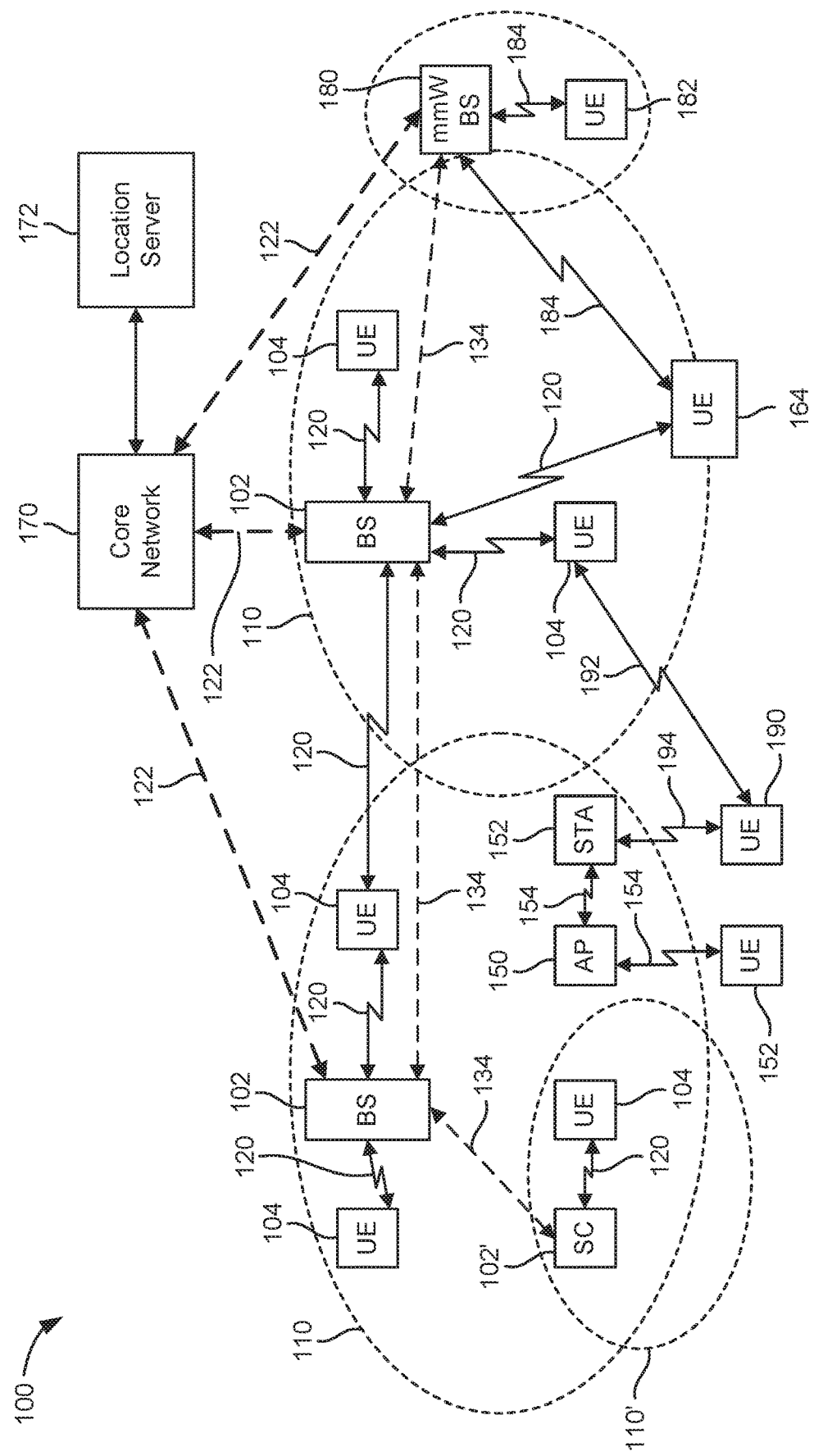
FIG. 1 is a diagram illustrating an example of a wireless communications system and an access network, according to various aspects of the disclosure.

These and other aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600

MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
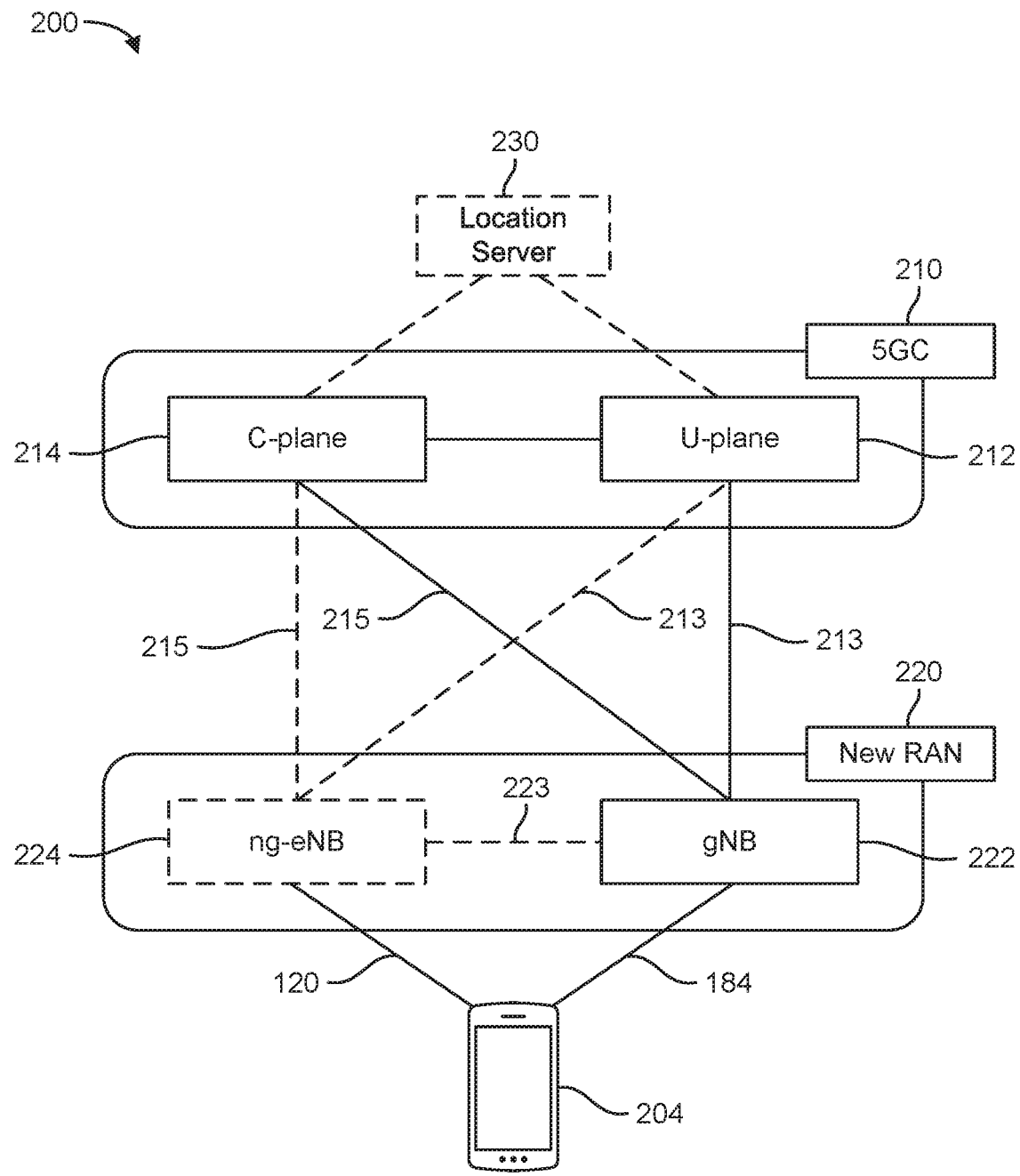
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
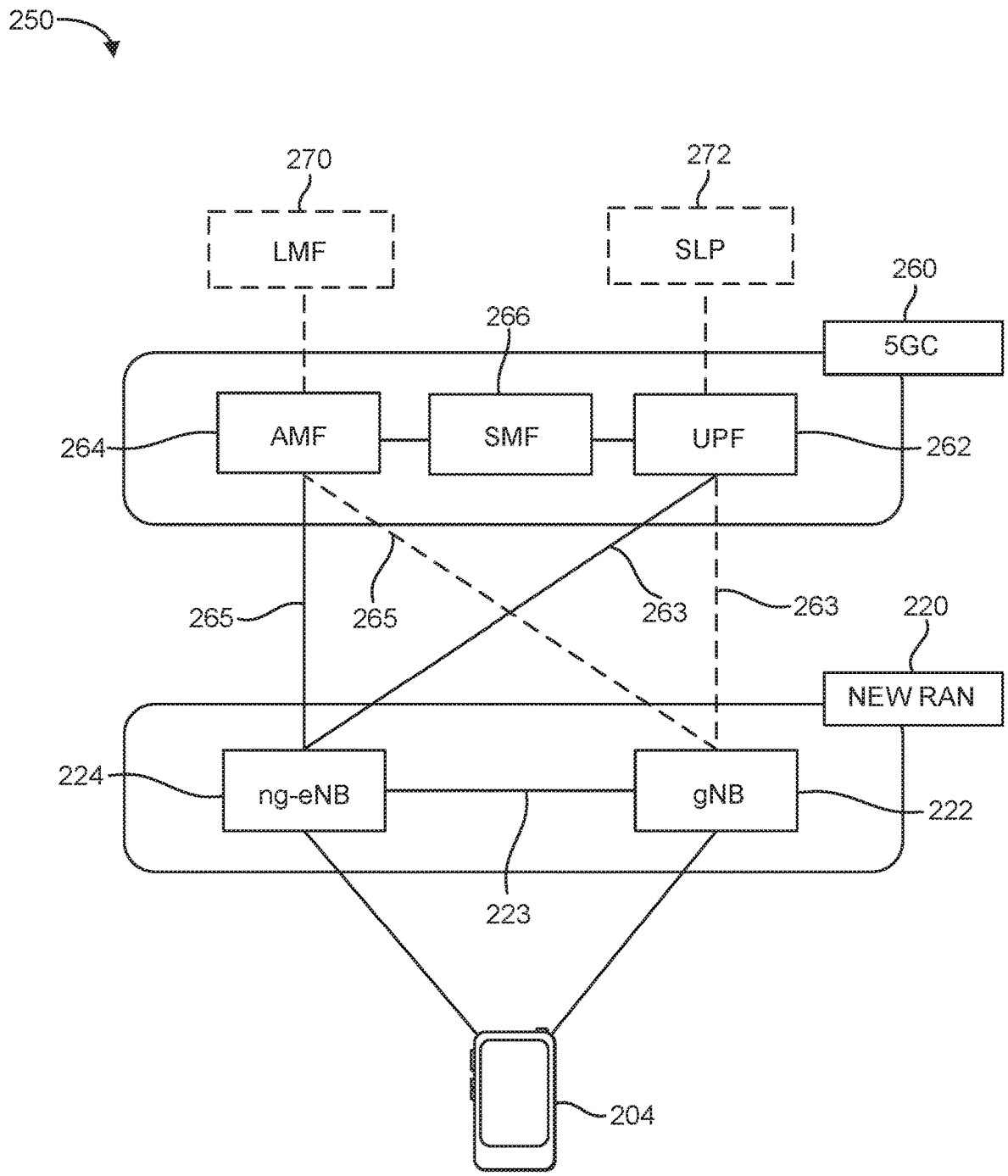

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
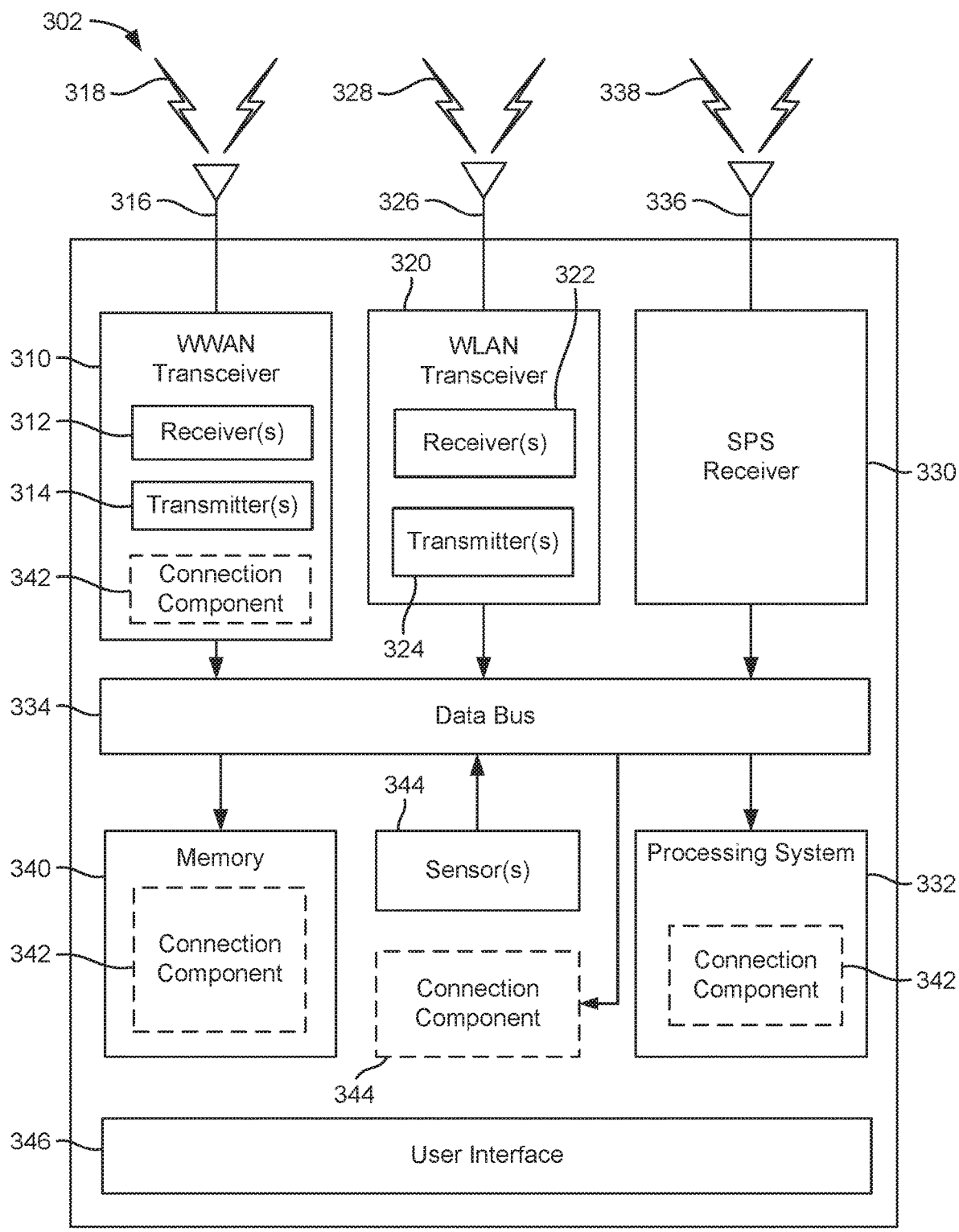
FIGS. 3A to 3C are simplified block diagrams of several sample aspects of components that may be employed in a user equipment (UE), base station, and network entity, respectively, to support communications as disclosed herein.
Figure 3B:
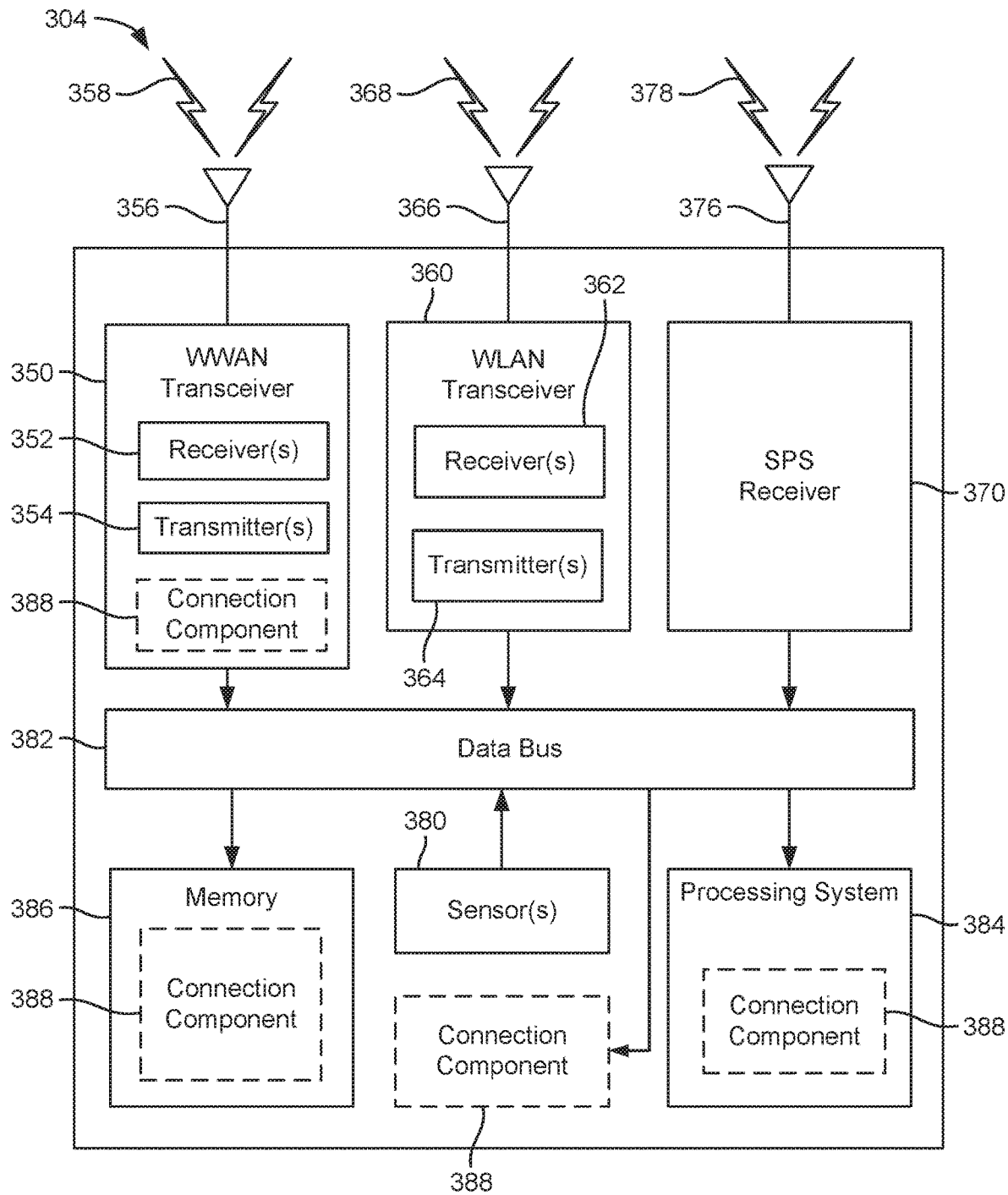
Figure 3C:
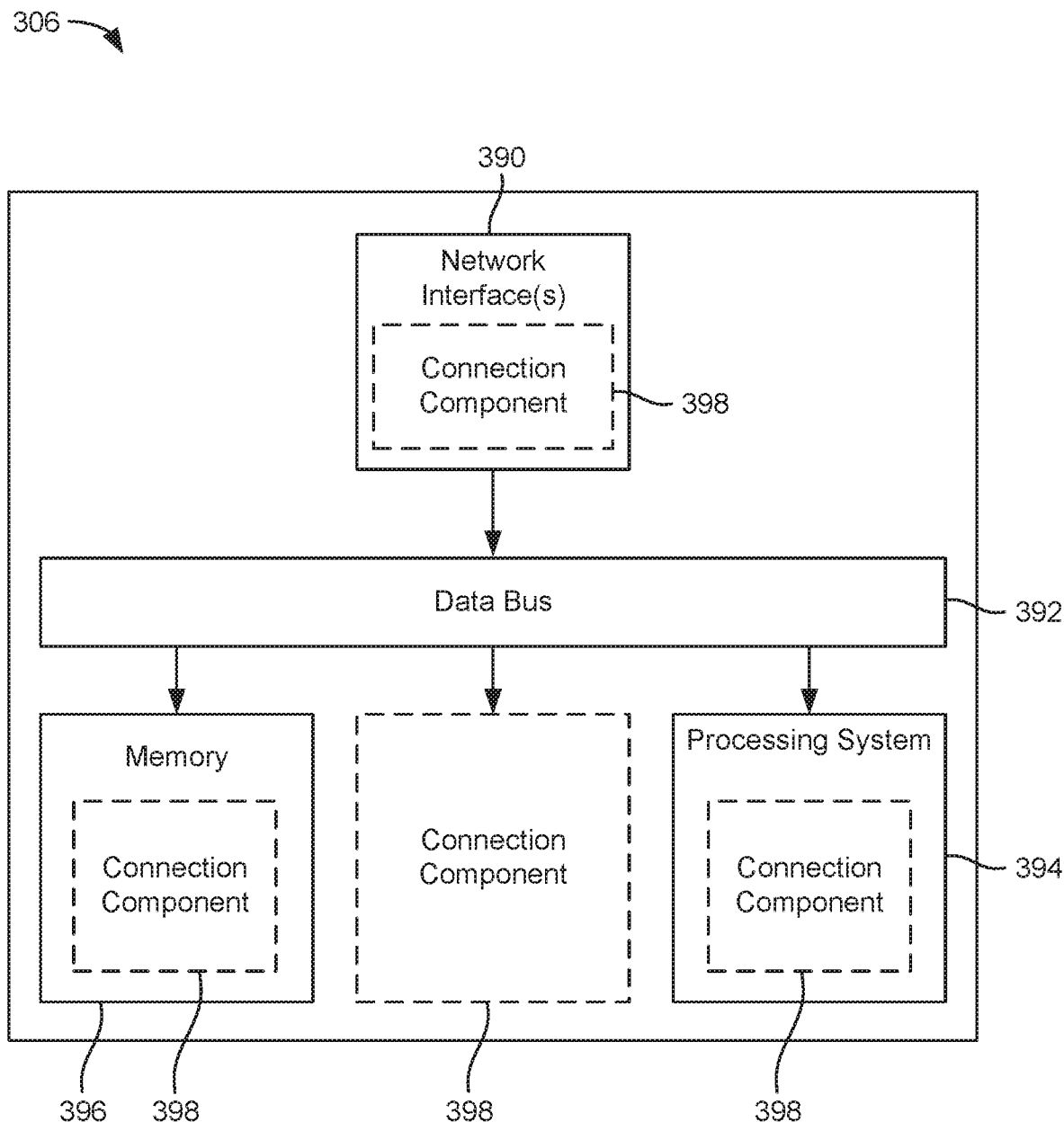

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include connection components 342, 388, and 398, respectively. The connection components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the connection components 342, 388, and 398 may be external to the processing systems 332, 384, and 394 (e.g., part of a modem processing system, integrated with another processing system, etc.). Alternatively, the connection components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the connection component 342, which may be part of the WWAN transceiver 310, the memory component 340, the processing system 332, or any combination thereof, or may be a standalone component. FIG. 3B illustrates possible locations of the connection component 388, which may be part of the WWAN transceiver 350, the memory component 386, the processing system 384, or any combination thereof, or may be a standalone component. FIG. 3C illustrates possible locations of the connection component 398, which may be part of the network interface(s) 390, the memory component 396, the processing system 394, or any combination thereof, or may be a standalone component.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream.

The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the connection components 342, 388, and 398, etc.

Figure 4A:
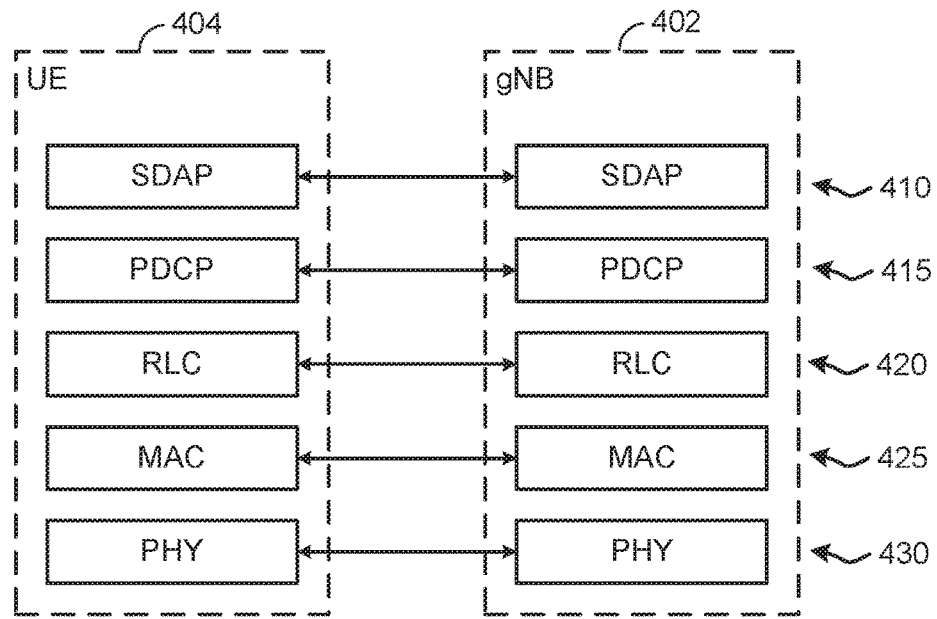
FIGS. 4A and 4B illustrate user plane and control plane protocol stacks, according to various aspects of the disclosure.

FIG. 4A illustrates a user plane protocol stack, according to various aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a PDCP layer 415, an RLC layer 420, a MAC layer 425, and a PHY layer 430. Particular instances of a protocol layer are referred to as protocol "entities." As such, protocol layers and protocol entities may be referred to interchangeably.

As illustrated by the double-arrow lines in FIG. 4A, each layer of the protocol stack implemented by the UE 404 communicates with the same layer of the base station 402, and vice versa. The two corresponding layers of the UE 404 and the base station 402 are referred to as "peers," "peer entities," and the like. Collectively, the SDAP layer 410, the PDCP layer 415, the RLC layer 420, and the MAC layer 425 are referred to as "Layer 2" or "L2." The PHY layer 430 is referred to as "Layer 1" or "L1."

Figure 4B:
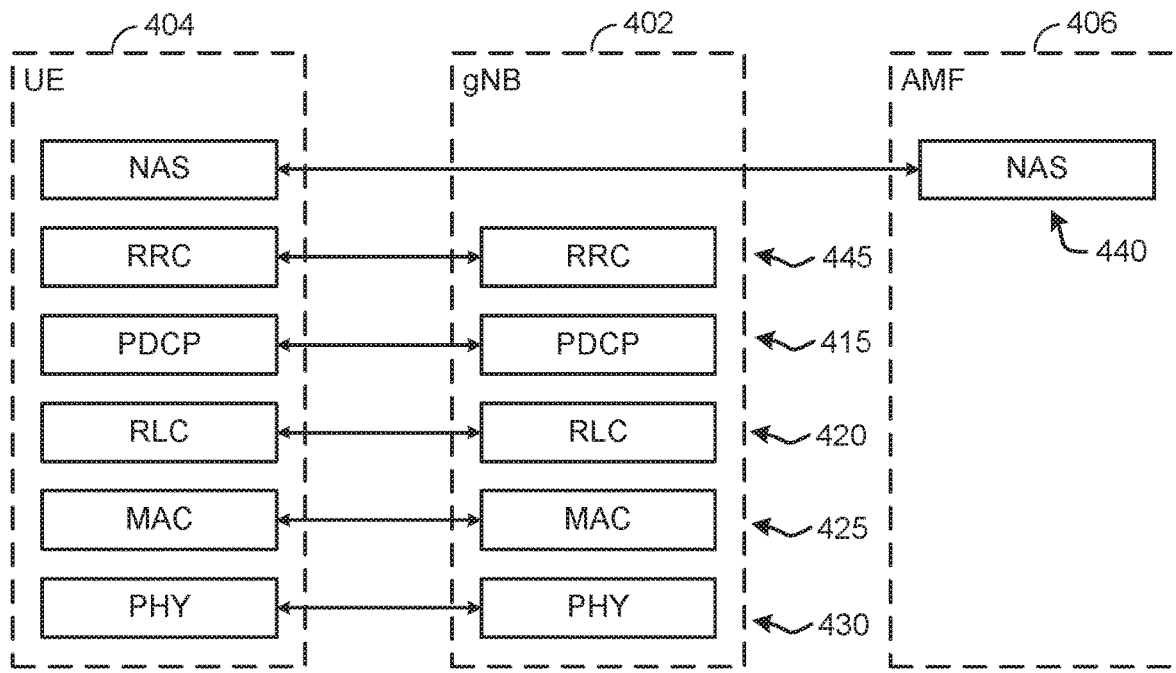

FIG. 4B illustrates a control plane protocol stack, according to various aspects of the disclosure. In addition to the PDCP layer 415, the RLC layer 420, the MAC layer 425, and the PHY layer 430, the UE 404 and the base station 402 also implement an RRC layer 445. Further, the UE 404 and an AMF 406 (e.g., AMF 264) implement a NAS layer 440.

The RLC layer 420 supports three transmission modes: transparent mode (TM), unacknowledged mode (UM), and acknowledged mode (AM). In TM mode, there is no RLC header, no segmentation/reassembly, and no feedback (i.e., no acknowledgment (ACK) or negative acknowledgment (NACK)). In addition, there is buffering at the transmitter only. In UM mode, there is an RLC header, buffering at both the transmitter and the receiver, and segmentation/reassembly, but no feedback (i.e., a data transmission does not require any reception response (e.g., ACK/NACK) from the receiver). In AM mode, there is an RLC header, buffering at both the transmitter and the receiver, segmentation/reassembly, and feedback (i.e., a data transmission requires a reception response (e.g., ACK/NACK) from the receiver). Each of these modes can be used to both transmit and receive data. In TM and UM modes, a separate RLC entity is used for transmission and reception, whereas in AM mode, a single RLC entity performs both transmission and reception. Note that each logical channel uses a specific RLC mode. That is, the RLC configuration is per logical channel with no dependency on numerologies and/or transmission time interval (TTI) duration (i.e., the duration of a transmission on the radio link). Specifically, the broadcast control channel (BCCH), paging control channel (PCCH), and common control channel (CCCH) use TM mode only, the dedicated control channel (DCCH) uses AM mode only, and the dedicated traffic channel (DTCH) uses UM or AM mode. Whether the DTCH uses UM or AM is determined by RRC messaging.

The main services and functions of the RLC layer 420 depend on the transmission mode and include transfer of upper layer PDUs, sequence numbering independent of the one in the PDCP layer 415, error correction through ARQ, segmentation and re-segmentation, reassembly of service data units (SDUs), RLC SDU discard, and RLC re-establishment. The ARQ functionality provides error correction in AM mode, and has the following characteristics: ARQ retransmits RLC PDUs or RLC PDU segments based on RLC status reports, polling for an RLC status report is used when needed by RLC, and the RLC receiver can also trigger an RLC status report after detecting a missing RLC PDU or RLC PDU segment.

The main services and functions of the PDCP layer 415 for the user plane include sequence numbering, header compression and decompression (for robust header compression (ROHC) only), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a QoS flow and a data radio bearer and marking QoS flow ID in both DL and UL packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE. In an aspect, the RRC layer 445 of the UE 404 may be implemented at least in part by the connection component 342 of the UE 302 in FIG. 3A, and the RRC layer 445 of the base station 402 may be implemented at least in part by the connection component 388 of the base station 304 in FIG. 3B.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain IP connectivity between the UE 404 and a packet data network. The NAS layer 440 performs EPS bearer management, authentication, EPS connection management (ECM)-IDLE mobility handling, paging origination in ECM-IDLE, and security control. In an aspect, the NAS layer 440 of the UE 404 may be implemented at least in part by the connection component 342 of the UE 302 in FIG. 3A, and the NAS layer 440 of the AMF 406 may be implemented at least in part by the connection component 398 of the network entity 306 in FIG. 3C.

Figure 5A:
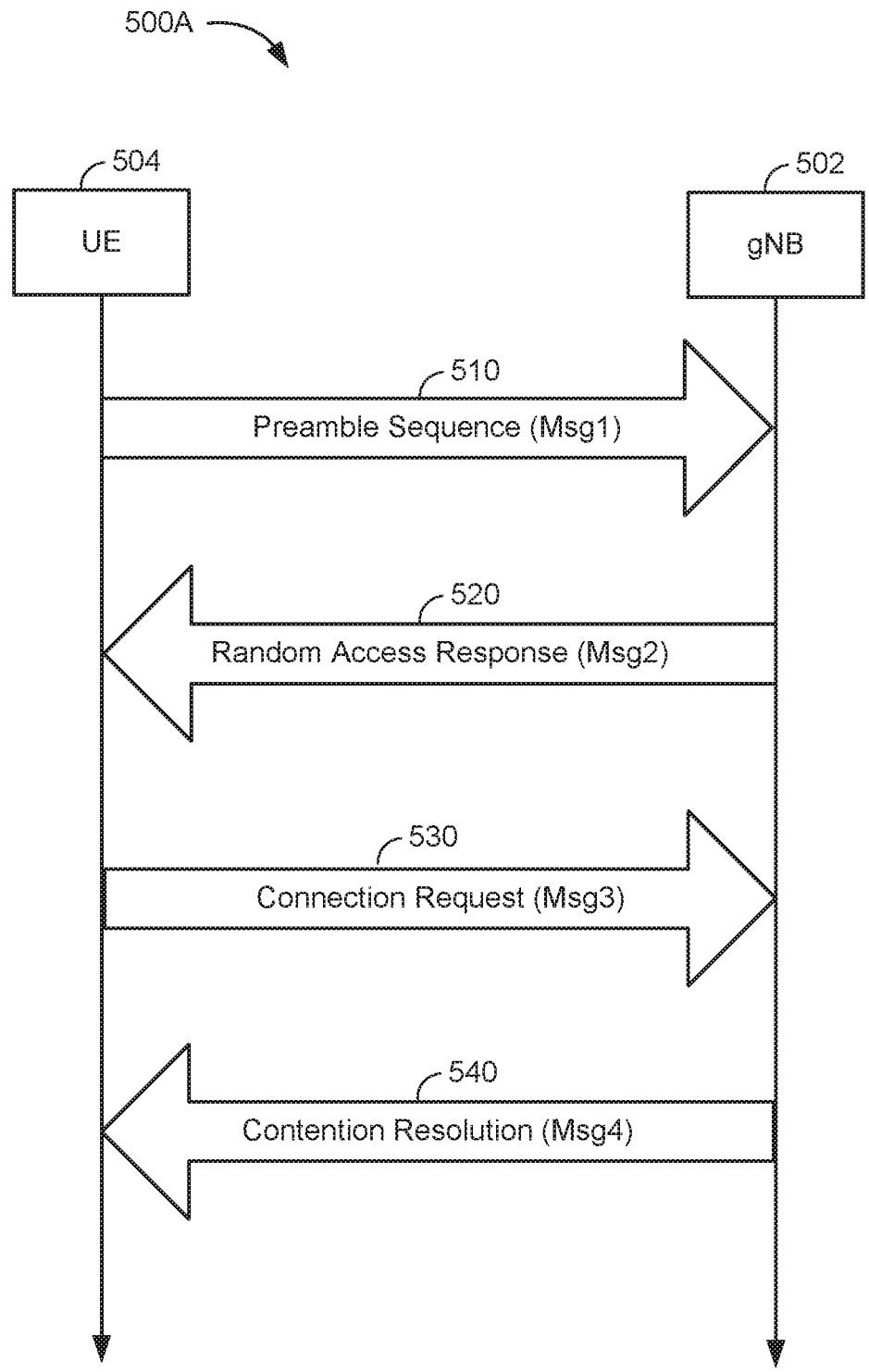
FIGS. 5A and 5B illustrate example random access procedures, according to various aspects of the disclosure.

FIG. 5A illustrates an example four-step random access procedure 500A, according to various aspects of the disclosure. The random access procedure 500A is performed between a UE 504 and a base station 502 (illustrated as a gNB), which may correspond to any of the UEs and base stations, respectively, described herein.

There are various situations in which a UE may perform the random access procedure 500A (also referred to as a random access channel (RACH) procedure). For example, a UE may perform the random access procedure 500A when acquiring initial network access after coming out of the RRC idle state, when performing an RRC connection re-establishment procedure, during a handover, when downlink or uplink data arrives and the UE is in an RRC connected state but its uplink synchronization status is "not-synchronized," when transitioning out of the RRC INACTIVE state, when establishing time alignment for the addition of an SCell, when requesting other synchronization information, or when performing beam failure recovery.

Before performing the random access procedure 500A, the UE 504 first reads one or more SSBs broadcasted by the base station 502 with which the UE 504 is performing the random access procedure 500A. In NR, each beam transmitted by a base station (e.g., base station 502) is associated with a different SSB, and a UE (e.g., UE 504) selects a certain beam to use to communicate with the base station 502. Based on the SSB of the selected beam, the UE 504 can then read the SIB type 1 (SIB1), which carries cell access related information and supplies the UE 504 with the scheduling of other system information blocks, transmitted on the selected beam.

When the UE sends the very first message of the random access procedure 500A to the base station 502, it sends a specific pattern called a preamble (also referred to as a RACH preamble, a PRACH preamble, or a sequence). The RACH preamble differentiates requests from different UEs 504. However, if two UEs 504 use the same RACH preamble at the same time, then there can be a collision. There are a total of 64 such patterns available to a UE 504, and, for contention-based random access, the UE 504 chooses one of them randomly. For contention-free random access, however, the network instructs the UE 504 about which one to use.

At 510, the UE 504 selects one of 64 RACH preambles to send to the base station 502 as a RACH request. This message is referred to as "Message 1" or "Msg1" in a four-step RACH procedure. Based on the synchronization information from the base station 502 (i.e., the SIB1), the UE 504 selects a RACH preamble and sends it at the RACH occasion (RO) corresponding to the selected SSB/beam. More specifically, in order for the base station 502 to determine which beam the UE 504 has selected, a specific mapping is defined between an SSB and an RO (which occurs every 10, 20, 40, 80, or 160 milliseconds (ms)). By detecting at which RO the UE 504 sent the preamble, the base station 502 can determine which SSB/beam the UE 504 selected.

Note that an RO is a time-frequency transmission opportunity for transmitting a RACH preamble, and a RACH preamble index (i.e., a value from 0 to 63 for the 64 possible preambles) enables the UE 504 to generate the type of RACH preamble expected at the base station 502. The RO and RACH preamble index may be configured to the UE 504 by the base station 502 in a SIB. A RACH resource is an RO in which one RACH preamble index is transmitted. As such, the terms "RO" (or "RACH occasion") and "RACH resource" may be used interchangeably, depending on the context.

Due to reciprocity, the UE 504 may use the uplink transmit beam corresponding to the best downlink receive beam determined during synchronization (i.e., the best receive beam to receive the selected downlink beam from the base station 502). That is, the UE 504 uses the parameters of the downlink receive beam used to receive the beam from the base station 502 to determine the parameters of the uplink transmit beam. If reciprocity is available at the base station 502, the UE 504 can transmit the preamble over one beam. Otherwise, the UE 504 repeats transmission of the same preamble on all of its uplink transmit beams.

The UE 504 also needs to provide its identity to the network (via base station 502) so that the network can address it in the next step. This identity is called the random access radio network temporary identity (RA-RNTI) and is determined from the time slot in which the RACH preamble is sent.

If the UE 504 does not receive any response from the base station 502 within some period of time, it increases its transmission power in a fixed step and sends the RACH preamble/Msg1 again. More specifically, the UE 504 transmits a first set of one or more repetitions of the selected RACH preamble at a first transmission power, and if no response is received within some period of time, transmits a second set of one or more repetitions of the RACH preamble at a second, higher transmission power. The UE 504 repeats these steps until a response is received (at 520) or until expiration of a timer indicating a failure to connect.

At 520, the base station 502 sends a random access response (RAR), referred to as a "Message 2" or "Msg2" in a four-step RACH procedure, to the UE 504 on the selected beam. The RAR is sent on a physical downlink shared channel (PDSCH) and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 502 assigns the C-RNTI to the UE 504 to enable further communication with the UE 504. The TA value specifies how much the UE 504 should change its timing to compensate for the round-trip delay between the UE 504 and the base station 502. The uplink grant resource indicates the initial resources the UE 504 can use on the physical uplink shared channel (PUSCH). After this step, the UE 504 and the base station 502 establish coarse beam alignment that can be utilized in the subsequent steps.

At 530, using the allocated PUSCH, the UE 504 sends an RRC connection request message, referred to as a "Message 3" or "Msg3," to the base station 502. Because the UE 504 sends the Msg3 over the resources scheduled by the base station 502, the base station 502 therefore knows where to detect the Msg3 and which uplink receive beam should be used. Note that the Msg3 PUSCH can be sent on the same or different uplink transmit beam than the Msg1.

The UE 504 identifies itself in the Msg3 by the C-RNTI assigned in the previous step. The message contains the UE's 504 identity and connection establishment cause. The UE's 504 identity is either a temporary mobile subscriber identity (TMSI) or a random value. A TMSI is used if the UE 504 has previously connected to the same network. The UE 504 is identified in the core network by the TMSI. A random value is used if the UE 504 is connecting to the network for the very first time. The reason for the random value or TMSI is that the C-RNTI may have been assigned to more than one UE in the previous step, due to multiple requests arriving at the same time. The connection establishment cause indicates the reason why the UE 504 needs to connect to the network.

At 540, if the Msg3 was successfully received, the base station 502 responds with a contention resolution message, referred to as a "Message 4" or "Msg4." This message is addressed to the TMSI or random value (from the Msg3) but contains a new C-RNTI that will be used for further communication. Specifically, the base station 502 sends the Msg4 in the PDSCH using the downlink transmit beam determined in the previous step.

The random access procedure 500A described above is a contention-based random access procedure. In contention-based random access, any UE 504 connecting to the same cell or TRP sends the same request, in which case there is a possibility of collision among the requests from the various UEs 504. In contention-free random access, the network can instruct a UE 504 to use some unique identity to prevent its request from colliding with requests from other UEs. A contention-free random access procedure can be performed when the UE 504 is in an RRC connected mode before the random access procedure, such as in the case of a handover.

Figure 5B:
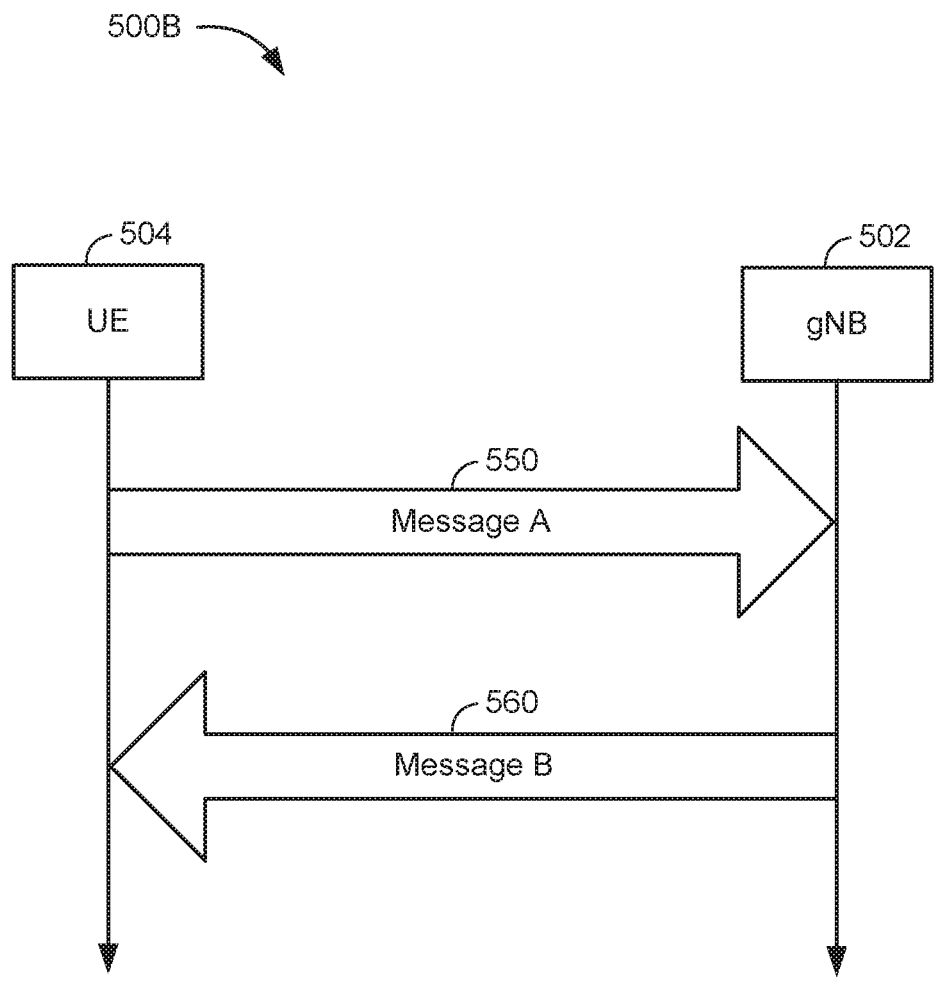

FIG. 5B illustrates an example two-step RACH procedure 500B, according to various aspects of the disclosure. The random access procedure 500B is performed between the UE 504 and the base station 502.

At 550, the UE 504 transmits a RACH Message A ("MsgA") to the base station 502. In a two-step RACH procedure 500B, Msg1 and Msg3, described above with reference to FIG. 5A, are collapsed (e.g., combined) into MsgA and sent to the base station 502. As such, a MsgA includes a RACH preamble and a PUSCH, similar to the Msg3 PUSCH of a four-step RACH procedure. The RACH preamble may have been selected from 64 possible preambles, as described above with reference to FIG. 5A, and may be used as a reference signal for demodulation of the data transmitted in the MsgA. At 560, the UE 504 receives a RACH Message B ("MsgB") from the base station 502. The MsgB may be a combination of Msg2 and Msg4 described above with reference to FIG. 5A.

The combination of Msg1 and Msg3 into one MsgA and the combination of Msg2 and Msg4 into one MsgB allows the UE 504 to reduce the RACH procedure setup time to support the low-latency requirements of 5G NR. Although the UE 504 may be configured to support the two-step RACH procedure 500B, the UE 504 may still support the four-step RACH procedure 500A as a fall back if the UE 504 is not be able to use the two-step RACH procedure 500B due to some constraints (e.g., high transmit power requirements, etc.). Therefore, a UE in 5G/NR may be configured to support both the two-step and the four-step RACH procedures, and may determine which RACH procedure to configure based on the RACH configuration information received from the base station.

After the random access procedure 500A or 500B, the UE 504 is in an RRC connected state. The RRC protocol is used for communication on the air interface between the UE 504 and the base station 502. In LTE, a UE may be in one of two RRC states (connected or idle), and in NR, a UE may be in one of three RRC states (connected, idle, or inactive). The different RRC states have different radio resources associated with them that the UE can use when it is in a given state.

Figure 6A:
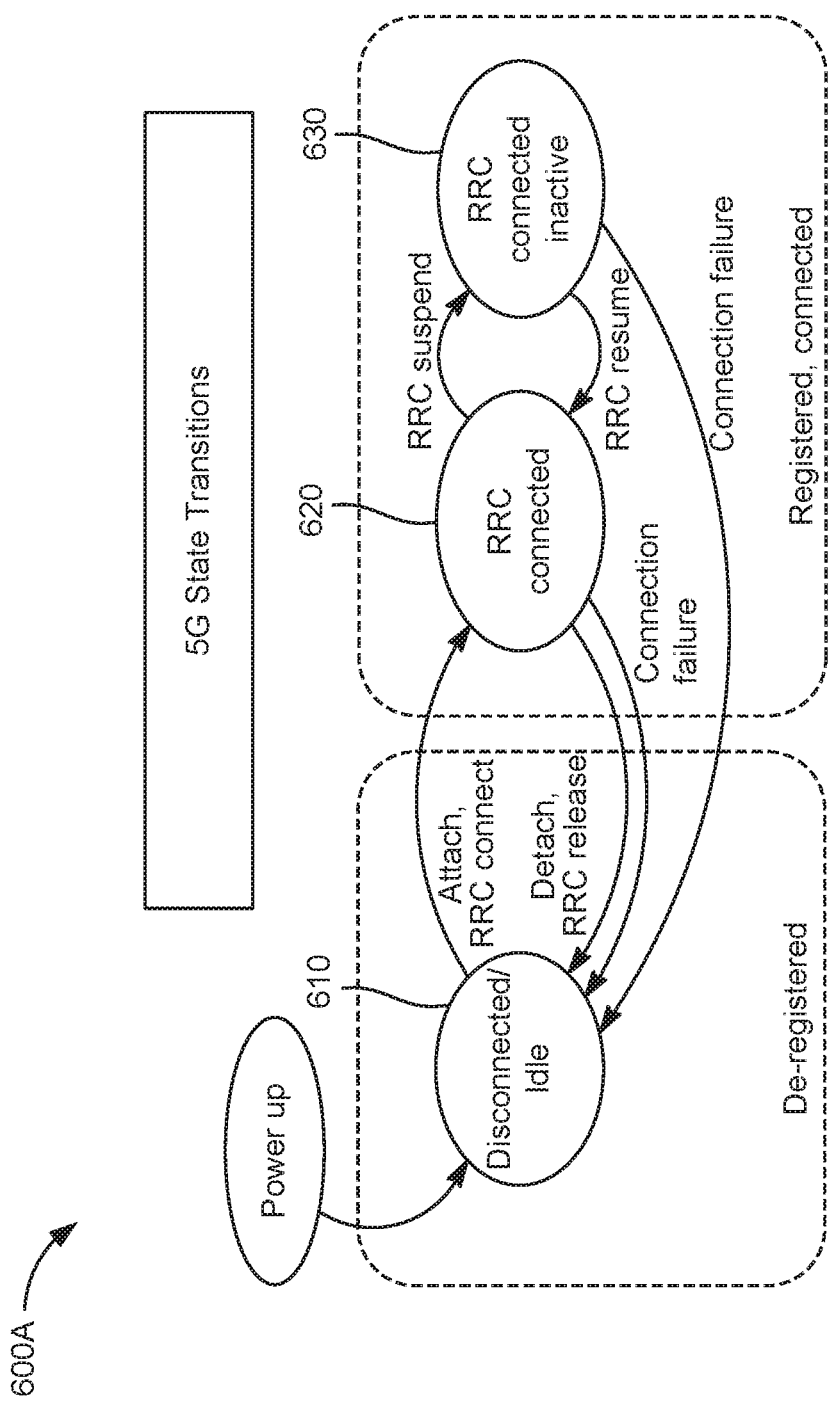
FIG. 6A illustrates the different radio resource control (RRC) states in NR, according to aspects of the disclosure.

FIG. 6A is a diagram 600A of the different RRC states in NR, according to various aspects of the disclosure. When a UE is powered up, it is initially in the RRC disconnected/idle state 610. After the random access procedure 500A or 500B, it moves to the RRC connected state 620. If there is no activity from UE for a short time, it can suspend its session by moving to the RRC inactive state 630. The UE can resume its session by performing a random access procedure 500A or 500B to transition back to the RRC connected state 620. Thus, the UE needs to perform a random access procedure 500A or 500B to transition to the RRC connected state 620, regardless of whether the UE is in the RRC idle state 610 or the RRC inactive state 630.

The operations performed in the RRC idle state 610 include public land mobile network (PLMN) selection, broadcast of system information, cell re-selection mobility, paging for mobile terminated data (initiated and managed by the NGC), discontinuous reception (DRX) for core network paging (configured by NAS). The operations performed in the RRC connected state 620 include NGC (e.g., NGC 260) and New RAN (e.g., New RAN 220) connection establishment (both control and user planes), UE context storage at the New RAN and the UE, New RAN knowledge of the cell to which the UE belongs, transfer of unicast data to/from the UE, and network controlled mobility. The operations performed in the RRC inactive state 630 include the broadcast of system information, cell re-selection for mobility, paging (initiated by the New RAN), RAN-based notification area (RNA) management (by the New RAN), DRX for RAN paging (configured by the New RAN), NGC and New RAN connection establishment for the UE (both control and user planes), storage of the UE context in the New RAN and the UE, and New RAN knowledge of the RNA to which the UE belongs.

Figure 6B:
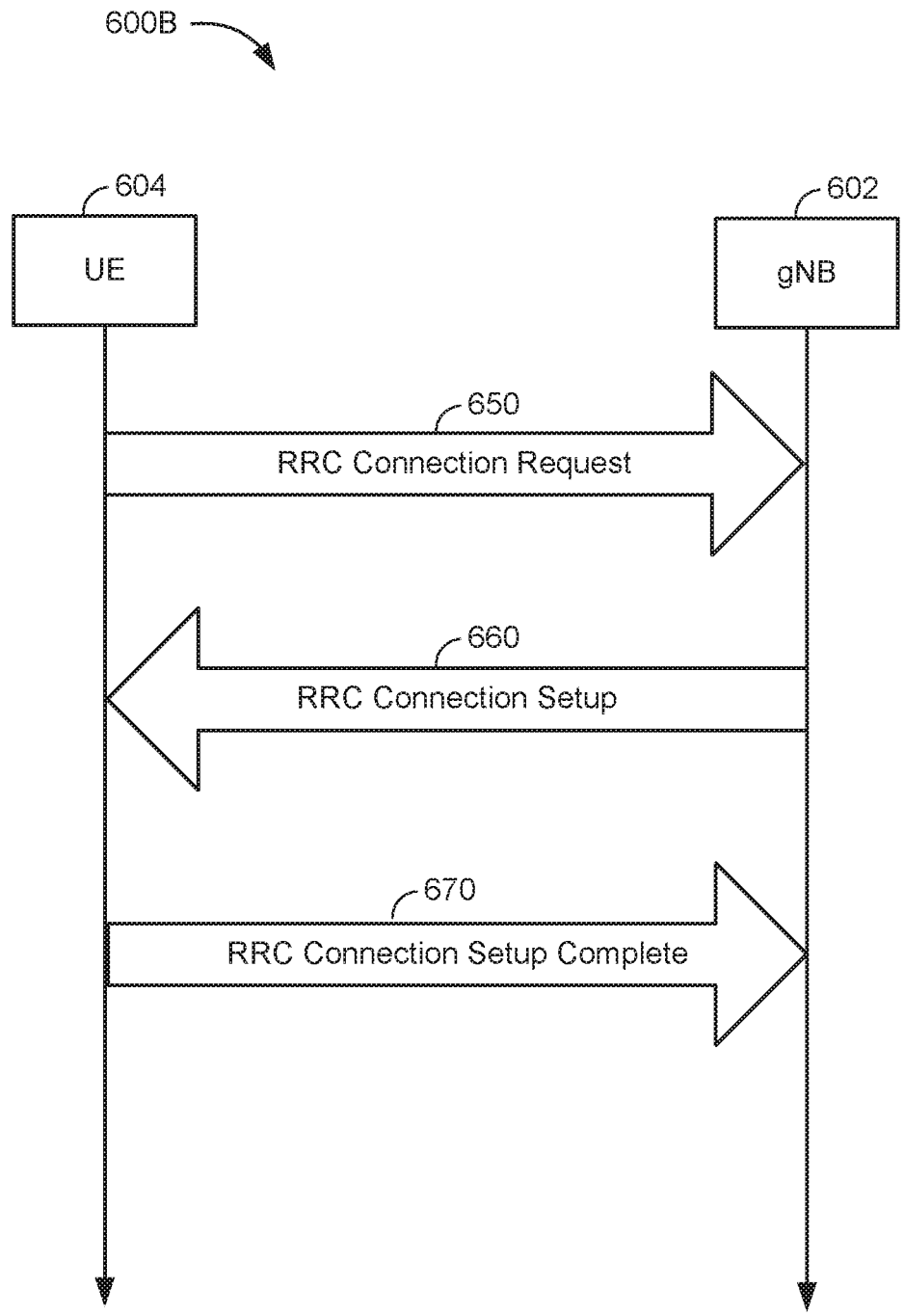
FIG. 6B illustrates an example RRC connection establishment procedure, according to various aspects of the disclosure.

FIG. 6B illustrates an example RRC connection establishment procedure 600B, according to various aspects of the disclosure. The RRC connection establishment procedure 600B is performed between a UE 604 and a base station 602 (illustrated as a gNB), which may correspond to any of the UEs and base stations, respectively, described herein. More specifically, the RRC connection establishment procedure 600B may be performed by the RRC layers 445 in FIG. 4 of the UE 604 and the base station 602.

The RRC layer may trigger the MAC layer (e.g., MAC layer 425 in FIG. 4) to perform the random access procedure 500A in FIG. 5A or 500B in FIG. 5B and then perform the RRC connection establishment procedure 600B once the random access procedure 500A/500B is successfully completed. The random access procedure 500A/500B and RRC connection establishment procedure 600B may be triggered by receipt of a mobile terminating (MT) page (e.g., for a voice call, a data flow, an SMS, etc.), transmission of mobile originating (MO) signaling, tracking area updates (TAUs) (periodic or based on power saving mode (PSM) exit), extended discontinuous reception (eDRX) parameter changes, tracking area (TA) changes, etc. The RRC connection establishment procedure 600B configures the SRB1 for the UE 604 and allows the UE 604 to inform the network (via the base station 602) of what it wants to perform (e.g., attach, service request, tracking area update (TAU), etc.).

At 650, the UE 604 sends an RRC connection request message to the base station 602. This may be the same RACH Msg3 as transmitted at 530 of FIG. 5A. Once the UE 604 has obtained temporary resources via Msg2 in the random access procedure, it is ready to send the RRC connection request message to the base station 602 using the UL-SCH. As discussed above, the RRC connection request message includes the UE's 604 identity (e.g., TMSI or a random value) and a connection establishment cause. The connection establishment cause simply shows the reason why the UE 604 needs to connect to the network (e.g., attach, service request, TAU, etc.).

At 660, the base station 602 sends an RRC connection setup message to the UE 604. The RRC connection setup message contains configuration details for the SRB1 so that later messages can be transferred via the SRB1. The RRC connection setup message includes a default configuration for the SRB1, but can also include configuration information for the PUSCH, physical uplink control channel (PUCCH), physical downlink shared channel (PDSCH), channel quality indicator (CQI) reports, SRS, antenna configuration(s), and scheduling requests.

At 670, after receiving the RRC connection setup message at 660, the UE 604 completes the RRC connection establishment procedure 600B by sending an RRC connection setup complete message to the base station 602 and switches to an RRC connected mode (e.g., RRC connected state 620). The RRC connection setup complete message contains an identifier of the selected PLMN and UE-specified NAS layer information to be transferred between the UE 604 and the network.

Various cellular technologies have been developed to support communication among IoT devices over cellular networks (referred to as cellular IoT (C-IoT) networks), such as extended coverage GSM IoT (EC-GSM-IoT), LTE for MTC (LTE-M), and NB-IoT. The present disclosure is concerned with the interaction of C-IoT networks, such as NB-IoT, with existing cellular networks, such as LTE, specifically, handling collisions of RACH requests due to multiple RRC connection requests in C-IoT networks.

NB-IoT (the first version of which is referred to as Cat NB1) can operate over a system bandwidth as low as 200 kHz, in stand-alone mode, within an LTE carrier, or within the guard-band of an LTE carrier. It also supports a minimum channel bandwidth of only 3.75 kHz. This gives NB-IoT high spectrum flexibility and system capacity. In addition, NB-IoT is designed to provide energy efficient operation (which allows for long device battery life, e.g., more than ten years), ultra-low device complexity, and ubiquities coverage. However, the energy efficiency comes at the cost of increased latency, particularly when establishing a new connection to the network, such as when performing an RRC connection establishment procedure.

The basic RRC connection establishment procedure (e.g., as illustrated in FIG. 6B) is the same for both LTE and NB-IoT. However, there are some differences between an RRC connection establishment procedure for LTE and an RRC connection establishment procedure for NB-IoT Cat NB1. In both cases, when a UE in the RRC idle state (e.g., RRC idle state 610) receives a page, the physical layer (e.g., PHY layer 430) decodes the page and passes it to the RRC layer (e.g., RRC layer 445). The RRC layer passes the page to the NAS layer (e.g., NAS layer 440), which starts the service request for the page. Once the NAS layer starts the service request, the UE performs the random access procedure 500A or 500B illustrated in FIGS. 5A and 5B followed by the three-step RRC connection establishment procedure 600B illustrated in FIG. 6B, which is also referred to as a connection request.

The overall time allowed for an RRC connection establishment procedure, including the corresponding random access procedure, is subject to the timer T300, which specifies the amount of time in which a connection needs to be established. T300 starts when the RRC connection request is received from the NAS layer and stops when the RRC connection setup complete message (e.g., at step 670), or when a rejection message is received, or at the cell reselection time, or when a higher layer (e.g., Layer 2, Layer 3) aborts the connection establishment procedure.

A difference between LTE and NB-IoT is that values of T300 are comparatively much larger in NB-IoT networks than in LTE networks. For example, T300 may be 300 ms in LTE as opposed to 25 seconds in NB-IoT commercial networks. Another difference is that there may be repetitions of the RACH request/preamble (e.g., at step 510 of FIG. 5A) and/or the random access response (e.g., at step 520 of FIG. 5A) in NB-IoT on the PUSCH and PDSCH, respectively, but not in LTE. Another difference is NB-IoT handling of TAUs while an RRC connection establishment procedure is ongoing. As such, there is an opportunity to improve the NB-IoT RRC connection establishment procedure to make it more robust.

In some cases, an event that triggers a new RRC connection establishment procedure may collide with an ongoing RRC connection establishment procedure. For example, a TAU request (due to DRX changes, periodic TAU, change in TA, etc.) may collide with an ongoing RRC connection establishment procedure for an MT page. In such cases, the ongoing RRC connection establishment procedure may be aborted and a new RRC connection establishment procedure may be started. In LTE, due to the smaller values of T300, there is a small window for such a conflict. However, in NB-IoT, since the value of T300 can be very large (e.g., 25 seconds), there is a much higher chance of having such a collision.

The following are example scenarios in NB-IoT in which an ongoing RRC connection establishment procedure may be aborted and a new one started. As a first scenario, if a UE receives an MT page and starts an RRC connection establishment procedure, and then a periodic NAS timer expires before the connection is established, the ongoing RRC connection establishment procedure will be aborted. As a second scenario, if the UE receives an MT page and then a request to set an eDRX configuration, the NAS layer will need to start a TAU procedure and the ongoing RRC connection establishment procedure associated with the MT page will be aborted. As another scenario, if the UE receives an MT page and then there is a change in PSM parameters, the ongoing RRC connection establishment procedure associated with the MT page will be aborted. As another scenario, if the UE is barred from MO signaling and the NAS layer receives a page and starts an RRC connection establishment procedure, during which the barring timer expires, a TAU will be triggered resulting in the ongoing RRC connection establishment procedure being aborted. As yet another scenario, if the MT page and UE voice domain preferences are changed (by the network), this will cause the UE to trigger a TAU, in response to which any ongoing RRC connection establishment procedure will be aborted. As still another scenario, if the UE is in NB1-only mode, the short message service (SMS) setting is over a control plane (CP), and the UE is attached without a packet data network (PDN), the SMS will be rejected temporarily due to a network failure. In response, timer T3411 will be started, and if an MT page is received and the random access procedure associated with the MT page finishes at the same time that T3411 expires, then the random access procedure will be aborted and a new RRC connection establishment procedure will be initiated.

Figure 7:
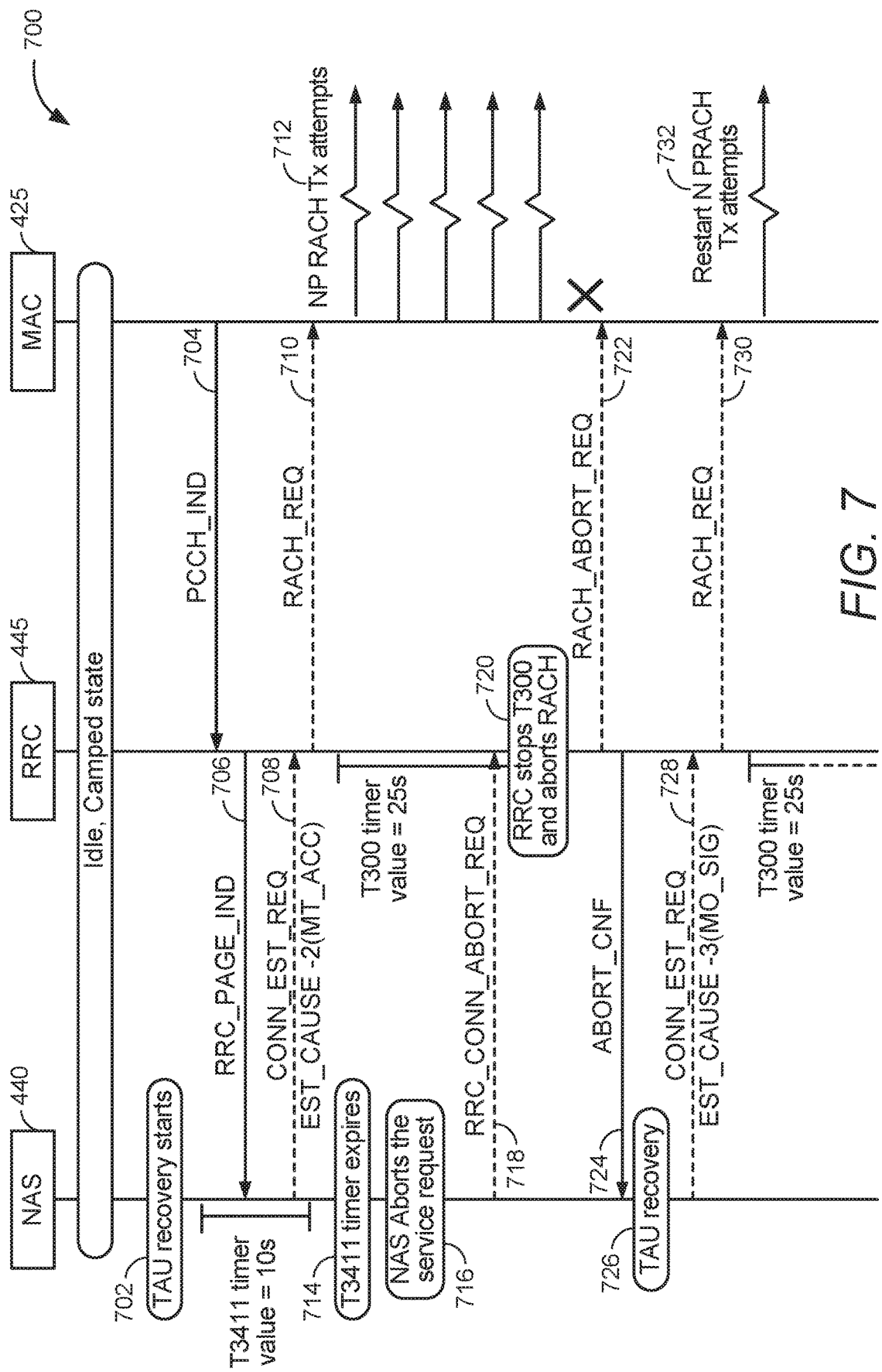
FIG. 7 illustrates an example call flow for connection establishment, according to various aspects of the disclosure.

An example collision scenario is illustrated in FIG. 7. FIG. 7 illustrates an example call flow 700 for connection establishment, according to aspects of the disclosure. The call flow 700 may be performed by any of the UEs described herein configured for NB-IoT operation while in the idle state. At 702, the NAS layer 440 of the UE starts a TAU recovery procedure and starts the timer T3411. The TAU recovery procedure may occur periodically every T3411 seconds (e.g., 10 seconds). Note that while a UE is in the idle state (e.g., RRC idle state 610), its location is known to the network at the TA level, rather than at the cell level as when in the connected/registered/active state (e.g., RRC connected state 620). A TA consists of a group of neighboring base stations and/or cells to which the UE is expected to be able to connect when it transitions to the active state. A TAU, therefore, informs the network of the TA in which the UE is located, and thereby, enables the network to send pages to the UE when the UE is in the idle state.

At 704 and 706, the UE, specifically, the MAC layer 425 and RRC layer 445, respectively, of the UE, receive and process an MT page from the network (i.e., PCCH_IND at the MAC layer 425 and RRC_PAGE_IND at the RRC layer 445). At 708, in response to reception of the MT page, the NAS layer 440 sends an RRC connection request (i.e., CONN_EST_REQ), with an establishment cause indicating that it is in response to an MT page (i.e., EST_CAUSE=2 (MT_ACC)), to the RRC layer 445. This message starts the RRC connection establishment procedure (e.g., RRC connection establishment procedure 600B in FIG. 6B) and corresponds to the RRC connection request at 650 of FIG. 6B. In response, at 710, the RRC layer 445 starts T300 and sends a request to perform a random access procedure to the MAC layer 425 (i.e., RACH_REQ). At 712, the MAC layer 425 begins transmitting sets of one or more RACH preambles/requests to the network, as at 510 of FIG. 5A. As discussed above, the UE may increase the transmit power by some step value for each set of repetitions of the transmission of the RACH preambles at 712. The transmission of the RACH preambles at 712 is the start of the random access procedure (e.g., random access procedure 500A in FIG. 5A).

At 714, T3411 expires, causing the TAU recovery procedure to collide with the ongoing connection establishment procedure associated with the MT page. In response, at 716, the NAS layer 440 aborts the service request for the connection request associated with the MT page. At 718, the NAS layer 440 sends an RRC abort request to the RRC layer 445 (i.e., RRC_CONN_ABORT_REQ). At 720, the RRC layer 445 stops T300 and, at 722, instructs the MAC layer 425 to abort the random access procedure (RACH_ABORT_REQ) associated with the MT page. In response, the MAC layer 425 stops transmitting RACH preambles to the network, thereby aborting the random access procedure. At 724, the RRC layer 445 sends an abort confirmation message to the NAS layer 440 (i.e., ABORT CNF).

At 726, after successfully aborting the RRC connection establishment procedure associated with the MT page, the NAS layer 440 performs the TAU recovery procedure. At 728, the NAS layer 440 sends a new RRC connection request (i.e., CONN_EST_REQ), with an establishment cause indicating that it is for MO signaling (i.e., EST_CAUSE=3 (MO_SIG)), to the RRC layer 445. In response, at 730, the RRC layer 445 restarts T300 and sends a new request to the MAC layer 425 to perform a new random access procedure (i.e., RACH_REQ). At 732, the MAC layer 425 again begins transmitting the RACH preambles/requests to the network, with increasing transmission power.

As shown in FIG. 7, and as occurs in each of the illustrative scenarios preceding the description of FIG. 7, when an event associated with a new connection establishment procedure occurs (e.g., TAU), the UE aborts any ongoing connection establishment procedure and starts a new one, with new RACH preamble transmissions (e.g., as at 712 and 732). This consumes a significant amount of time to ramp-up the transmission power of the RACH preambles when they are restarted. This has an impact on the key performance indicator (KPI) of connection setup time, and hence, user experience.

Accordingly, the present disclosure provides techniques in which at least the RACH preamble transmissions of an ongoing connection establishment procedure are not aborted in certain cases, such as where the new connection establishment procedure is associated with a periodic TAU. For example, where RACH preamble transmissions (e.g., as at 712 and 732) have been started due to receipt of an MT page, then, if the connection is established successfully, there will not be a need to perform, for example, a periodic TAU, since the UE will be in the RRC connected state (e.g., RRC connected state 620) and the network will now know the UE's location at the cell level. Thus, in some cases, a new RRC connection establishment procedure may not be needed for a periodic TAU, since the UE may already be connected when the periodic TAU is to occur.

Conventionally, a TAU recovery is considered to be more important than an MT page, and as such, expiry of timer T3411 is given priority over expiry of timer T300. This is appropriate for legacy systems where connection establishment is very fast, but because the RACH procedure is much longer for NB-IoT (on the order of seconds), the aim of the disclosed techniques is to avoid aborting the connection request and instead allow it to be performed. If the connection request is aborted, there is no guarantee that the next RACH will be completed, but if the connection request is not aborted, then there is a possibility that the next RACH (for the TAU) will not be needed.

For non-periodic TAUs due, for example, to eDRX changes, PSM exit, cell changes, etc., a TAU request can be buffered until a previous connection establishment procedure associated with an MT page either succeeds or fails. If the connection establishment procedure fails, the buffered connection request associated with the TAU will be triggered. If the connection establishment procedure succeeds, the buffered connection request will be discarded (e.g., flushed from the buffer).

The following is an example of when there is a collision between an RRC connection establishment procedure due to an MT page and an RRC connection establishment procedure due to a periodic TAU. In the present example, with reference to FIG. 7, the UE has received an MT page and has started an RRC connection establishment procedure (e.g., 704-712). While T300 (e.g., 25 seconds) is running, there may be collision scenarios, as described above. In the present example, as in the example of FIG. 7, there is a collision with a periodic TAU. However, according to the disclosed techniques, a fresh RRC connection establishment procedure, and the corresponding random access procedure, can be avoided.

Specifically, during the random access procedure portion of the first RRC connection establishment procedure, the transmission power for the RACH preambles (e.g., as at 712) may have been ramped up due to multiple RACH attempts. Therefore, rather than abort the ongoing RRC connection establishment procedure, the UE can wait until it either completes successfully or fails. If the RRC connection establishment procedure completes successfully (i.e., the UE successfully connects to the network), the subsequent RRC connection establishment procedure will not be needed, since the UE will be in the connected state and the network will know the UE's location (at the cell level). If, however, the RRC connection establishment procedure associated with the MT page fails, an RRC connection establishment procedure associated with the periodic TAU can be triggered. In this way, the UE will be able to respond to the MT page without aborting the RRC connection establishment procedure associated with the MT page. In addition, the UE will improve connection setup time because it will not have to abort the ongoing random access procedure for the RRC connection establishment procedure associated with the MT page, and will additionally eliminate the need to send the periodic TAU.

The present techniques provide various technical advantages. For example, when the timer T300 related to the MT page is already running and a connection succeeds before expiration of T300, there is no need to send a fresh connection request for a colliding TAU. Therefore, if priority is no longer given to the expiry of timer T3411 over the expiry of timer T300 and the first RACH procedure associated with the MT page is not aborted upon expiry of timer T3411, as is conventional, but rather, is allowed to either succeed or fail (e.g., by expiry of timer T300), connection setup time can be improved by, for example, up to the value of T300, which is generally 25 seconds.

The following is an example of when there is collision between an RRC connection establishment procedure for an MT page and an RRC connection establishment procedure for a non-periodic TAU (e.g., eDRX change, PSM exit, etc.). In the present example, with reference to FIG. 7, the UE has received an MT page and has started an RRC connection establishment procedure (e.g., 704-712). While T300 (e.g., 25 seconds) is running, there may be collision scenarios, as described above. In the present example, there is a collision with a normal TAU due to an eDRX change.

Specifically, while the first RRC connection establishment procedure is ongoing, the TAU request can be buffered and then transmitted once the T300 associated with the MT page connection request is stopped (due to successful connection) or expires (due to failed connection). This gives the UE the opportunity to respond to the MT page instead of ignoring it, as is currently done, thereby improving the success rate of MT pages.

In the case that a TAU is triggered because of a tracking area change, the RRC connection establishment procedure associated with an ongoing MT page can be aborted, a request to perform the RRC connection establishment procedure associated with the MT page can buffered, and the request can be responded to (i.e., the RRC connection establishment procedure associated with the MT page can be performed) after the TAU procedure is finished.

Figure 8:
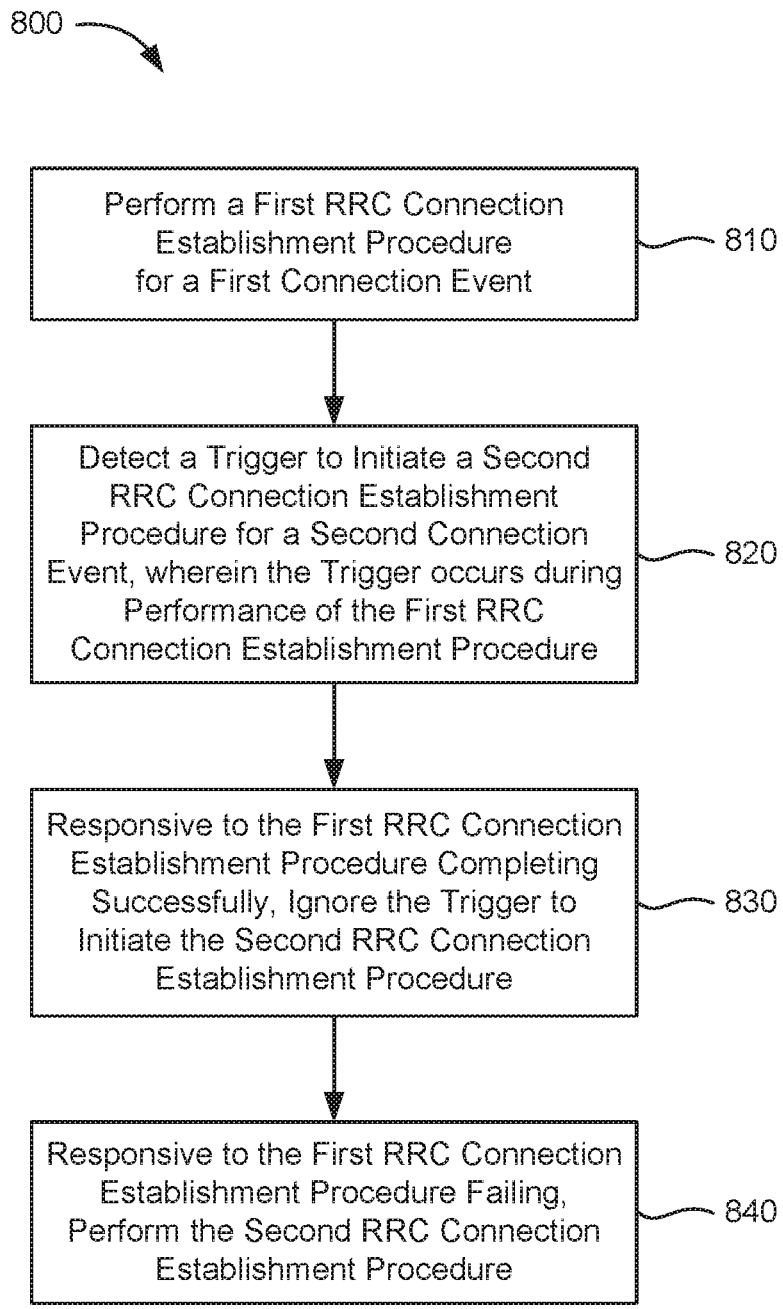
FIGS. 8 to 10 illustrate example methods of connection establishment in a wireless communications system, according to various aspects of the disclosure.

FIG. 8 illustrates an example method 800 of wireless communication, according to aspects of the disclosure. The method 800 may be performed by any of the UEs described herein capable of NB-IoT communication.

At 810, the UE (e.g., RRC layer 445) performs a first RRC connection establishment procedure for a first connection event (e.g., MT page). An example of the first RRC connection establishment procedure can include a procedure associated with a connection establishment request similar to 708 for a first connection event similar to the MT page received at 704 and 706 of FIG. 7. In an aspect, operation 810 may be performed by the WWAN transceiver 310, the processing system 332, the memory component 340, and/or the connection component 342, any or all of which may be considered "means" for performing this operation.

At 820, the UE (e.g., RRC layer 445) detects a trigger to initiate a second RRC connection establishment procedure for a second connection event (e.g., periodic TAU), wherein the trigger occurs during performance of the first RRC connection establishment procedure. With reference to FIG. 7, instead of aborting the connection establishment request as in 716 to 714, the UE can proceed as described in 820 to 840 below. In an aspect, operation 820 may be performed by the WWAN transceiver 310, the processing system 332, the memory component 340, and/or the connection component 342, any or all of which may be considered "means" for performing this operation.

At 830, the UE (e.g., RRC layer 445), responsive to the first RRC connection establishment procedure completing successfully, ignores the trigger to initiate the second RRC connection establishment procedure. In an aspect, operation 830 may be performed by the WWAN transceiver 310, the processing system 332, the memory component 340, and/or the connection component 342, any or all of which may be considered "means" for performing this operation.

At 840, the UE (e.g., RRC layer 445), responsive to the first RRC connection establishment procedure failing, performs the second RRC connection establishment procedure. In an aspect, operation 840 may be performed by the WWAN transceiver 310, the processing system 332, the memory component 340, and/or the connection component 342, any or all of which may be considered "means" for performing this operation.

Figure 9:
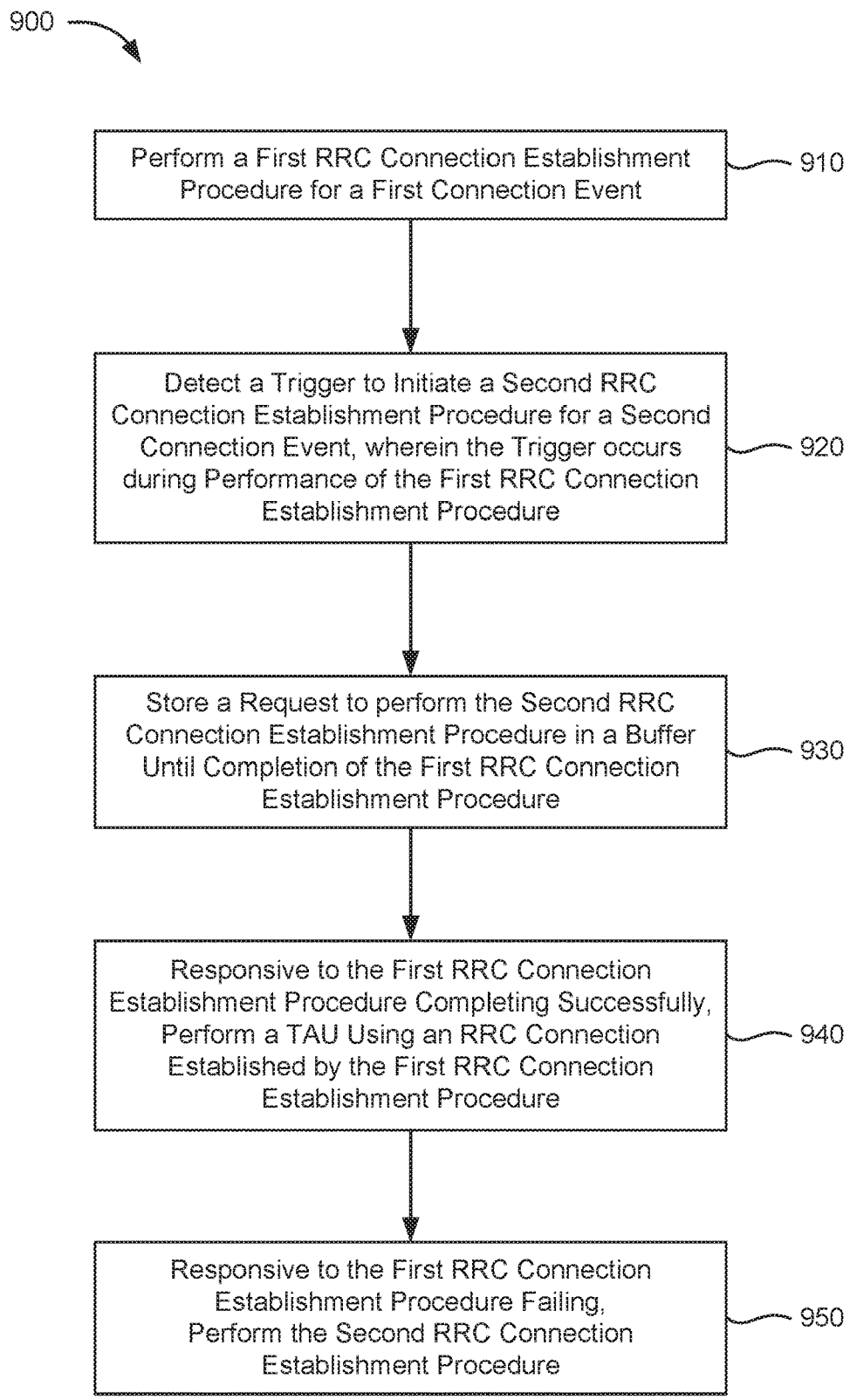

FIG. 9 illustrates an example method 900 of wireless communication, according to aspects of the disclosure. The method 900 may be performed by any of the UEs described herein capable of NB-IoT communication.

At 910, the UE (e.g., RRC layer 445) performs a first RRC connection establishment procedure for a first connection event (e.g., MT page). An example of the first RRC connection establishment procedure can include a procedure associated with a connection establishment request similar to 708 for a first connection event similar to the MT page received at 704 and 706 of FIG. 7. In an aspect, operation 910 may be performed by the WWAN transceiver 310, the processing system 332, the memory component 340, and/or the connection component 342, any or all of which may be considered "means" for performing this operation.

At 920, the UE (e.g., RRC layer 445) detects a trigger to initiate a second RRC connection establishment procedure for a second connection event (e.g., non-periodic TAU), wherein the trigger occurs during performance of the first RRC connection establishment procedure. With reference to FIG. 7, instead of aborting the connection establishment request as in 716 to 714, the UE can proceed as described in 920 to 950 below. In an aspect, operation 920 may be performed by the WWAN transceiver 310, the processing system 332, the memory component 340, and/or the connection component 342, any or all of which may be considered "means" for performing this operation.

At 930, the UE (e.g., RRC layer 445) stores a request to perform the second RRC connection establishment procedure in a buffer until completion of the first RRC connection establishment procedure. In an aspect, operation 930 may be performed by the WWAN transceiver 310, the processing system 332, the memory component 340, and/or the connection component 342, any or all of which may be considered "means" for performing this operation.

At 940, the UE (e.g., RRC layer 445), responsive to the first RRC connection establishment procedure completing successfully, performs a TAU using an RRC connection established by the first RRC connection establishment procedure. In an aspect, operation 940 may be performed by the WWAN transceiver 310, the processing system 332, the memory component 340, and/or the connection component 342, any or all of which may be considered "means" for performing this operation.

At 950, the UE (e.g., RRC layer 445), responsive to the first RRC connection establishment procedure failing, performs the second RRC connection establishment procedure. In an aspect, operation 950 may be performed by the WWAN transceiver 310, the processing system 332, the memory component 340, and/or the connection component 342, any or all of which may be considered "means" for performing this operation.

Figure 10:
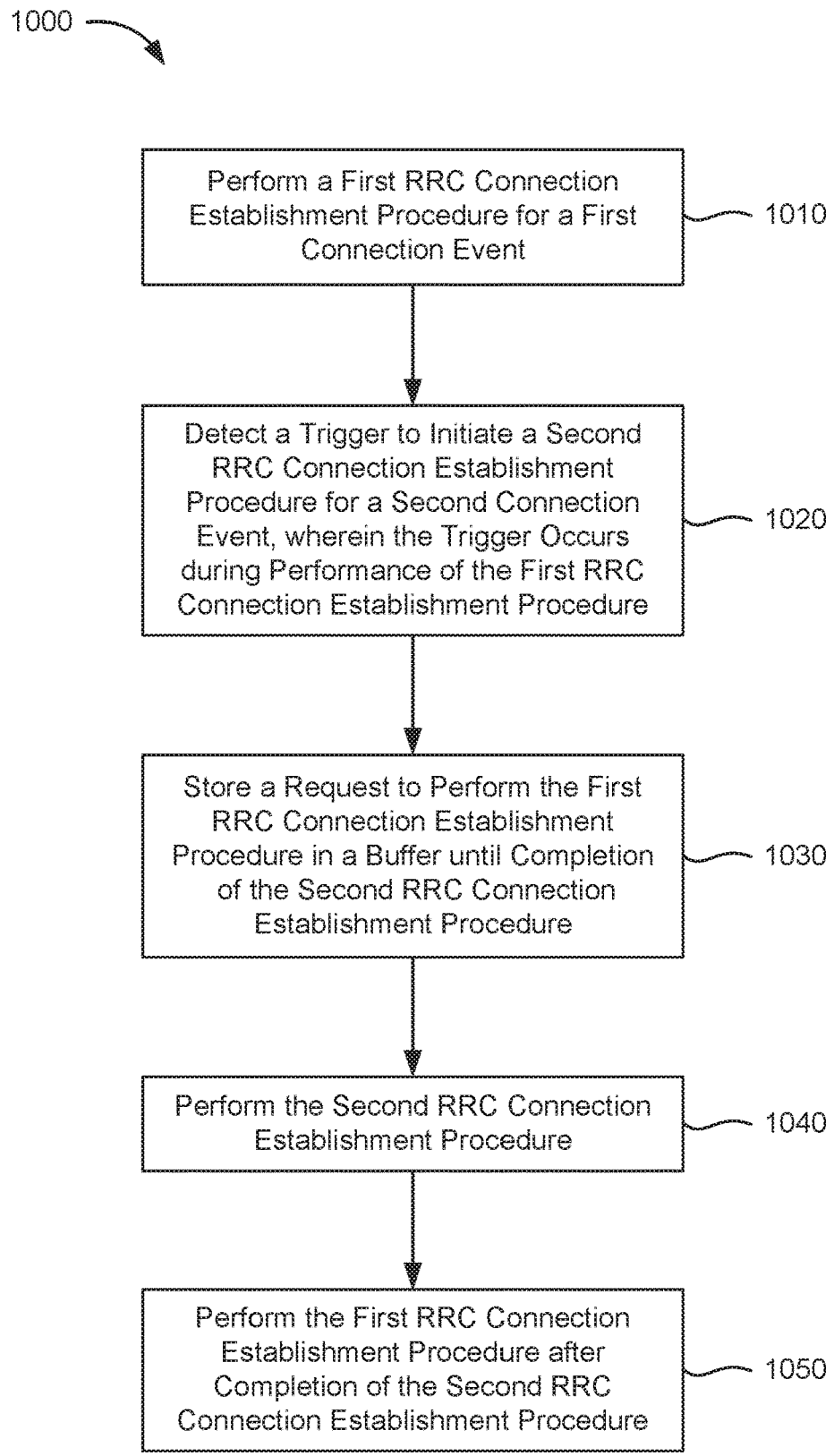

FIG. 10 illustrates an example method 1000 of wireless communication, according to aspects of the disclosure. The method 1000 may be performed by any of the UEs described herein capable of NB-IoT communication.

At 1010, the UE (e.g., RRC layer 445) performs a first RRC connection establishment procedure for a first connection event (e.g., MT page). An example of the first RRC connection establishment procedure can include a procedure associated with a connection establishment request similar to 708 for a first connection event similar to the MT page received at 704 and 706 of FIG. 7. In an aspect, operation 1010 may be performed by the WWAN transceiver 310, the processing system 332, the memory component 340, and/or the connection component 342, any or all of which may be considered "means" for performing this operation.

At 1020, the UE (e.g., RRC layer 445) detects a trigger to initiate a second RRC connection establishment procedure for a second connection event (e.g., tracking area change), wherein the trigger occurs during performance of the first RRC connection establishment procedure. With reference to FIG. 7, instead of aborting the connection establishment request as in 716 to 714, the UE can proceed as described in 1020 to 1050 below. In an aspect, operation 1020 may be performed by the WWAN transceiver 310, the processing system 332, the memory component 340, and/or the connection component 342, any or all of which may be considered "means" for performing this operation.

At 1030, the UE (e.g., RRC layer 445) stores a request to perform the first RRC connection establishment procedure in a buffer until completion of the second RRC connection establishment procedure. In an aspect, operation 1030 may be performed by the WWAN transceiver 310, the processing system 332, the memory component 340, and/or the connection component 342, any or all of which may be considered "means" for performing this operation.

At 1040, the UE (e.g., RRC layer 445) performs the second RRC connection establishment procedure. In an aspect, operation 1040 may be performed by the WWAN transceiver 310, the processing system 332, the memory component 340, and/or the connection component 342, any or all of which may be considered "means" for performing this operation.

At 1050, the UE (e.g., RRC layer 445) performs the first RRC connection establishment procedure after completion of the second RRC connection establishment procedure. In an aspect, operation 1050 may be performed by the WWAN transceiver 310, the processing system 332, the memory component 340, and/or the connection component 342, any or all of which may be considered "means" for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    performing a first radio resource control (RRC) connection establishment procedure for a first connection event;
    detecting a trigger to initiate a second RRC connection establishment procedure for a second connection event, wherein the trigger occurs during performance of the first RRC connection establishment procedure;
    storing a request to perform the second RRC connection establishment procedure in association with the trigger in a buffer until completion of the first RRC connection establishment procedure, such that the second RRC connection establishment procedure is not performed during the performance of the first RRC connection establishment procedure;
    responsive to the first RRC connection establishment procedure completing successfully, ignoring the request to perform the second RRC connection establishment procedure; and
    responsive to the first RRC connection establishment procedure failing, performing the second RRC connection establishment procedure based on the request.

2. The method of claim 1, wherein:
    the first connection event comprises a mobile terminating (MT) page, and
    the second connection event comprises a periodic tracking area update (TAU).

3. The method of claim 2, wherein the trigger to initiate the second RRC connection establishment procedure comprises an expiration of a periodic timer associated with the periodic TAU.

4. The method of claim 1, wherein performing the first RRC connection establishment procedure comprises:
    transmitting one or more sets of one or more repetitions of random access channel (RACH) preambles, each of the one or more sets of one or more repetitions of the RACH preambles transmitted at a higher transmission power than a previous set of one or more repetitions of the RACH preambles.

5. The method of claim 4, wherein the trigger to initiate the second RRC connection establishment procedure occurs during transmission of the one or more sets of one or more repetitions of the RACH preambles of the first RRC connection establishment procedure.

6. The method of claim 1, wherein detecting the trigger to initiate the second RRC connection establishment procedure comprises a non-access stratum (NAS) layer of the UE detecting the trigger to initiate the second RRC connection establishment procedure.

7. The method of claim 1,
    wherein performing the first RRC connection establishment procedure comprises an RRC layer and a medium access control (MAC) layer of the UE performing the first RRC connection establishment procedure.

8. The method of claim 1, wherein the ignoring comprises:
    flushing the request to perform the second RRC connection establishment procedure from the buffer based on the first RRC connection establishment procedure completing successfully.

9. The method of claim 1, wherein the performing the second RRC connection establishment procedure comprises:
    retrieving the request to perform the second RRC connection establishment procedure; and
    performing the second RRC connection establishment procedure.

10. A method of wireless communication performed by a user equipment (UE), comprising:
    performing a first radio resource control (RRC) connection establishment procedure for a first connection event;
    detecting a trigger to initiate a second RRC connection establishment procedure for a second connection event, wherein the trigger occurs during performance of the first RRC connection establishment procedure;
    storing a request to perform the second RRC connection establishment procedure in a buffer until completion of the first RRC connection establishment procedure;
    responsive to the first RRC connection establishment procedure completing successfully, performing a tracking area update (TAU) using an RRC connection established by the first RRC connection establishment procedure; and
    responsive to the first RRC connection establishment procedure failing, performing the second RRC connection establishment procedure.

11. The method of claim 10, wherein:
the first connection event comprises a mobile terminating (MT) page, and
the second connection event comprises a non-periodic tracking area update (TAU), an extended discontinuous reception (eDRX) parameter change, or a power saving mode (PSM) change.

12. The method of claim 10, wherein performing the first RRC connection establishment procedure comprises:
transmitting one or more sets of one or more repetitions of random access channel (RACH) preambles, each of the one or more sets of one or more repetitions of the RACH preambles transmitted at a higher transmission power than a previous set of one or more repetitions of the RACH preambles.

13. The method of claim 12, wherein the trigger to initiate the second RRC connection establishment procedure occurs during transmission of the one or more sets of one or more repetitions of the RACH preambles of the first RRC connection establishment procedure.

14. The method of claim 10, wherein detecting the trigger to initiate the second RRC connection establishment procedure comprises a non-access stratum (NAS) layer of the UE detecting the trigger to initiate the second RRC connection establishment procedure.

15. The method of claim 10, wherein performing the first RRC connection establishment procedure comprises an RRC layer and a medium access control (MAC) layer of the UE performing the first RRC connection establishment procedure.

16. The method of claim 10, wherein completion of the first RRC connection establishment procedure comprises expiration or stoppage of a connection establishment timer.

17. A method of wireless communication performed by a user equipment (UE), comprising:
performing a first radio resource control (RRC) connection establishment procedure for a first connection event;
detecting a trigger to initiate a second RRC connection establishment procedure for a second connection event, wherein the trigger occurs during performance of the first RRC connection establishment procedure;
storing a request to perform the first RRC connection establishment procedure in a buffer until completion of the second RRC connection establishment procedure;
performing the second RRC connection establishment procedure; and
performing the first RRC connection establishment procedure after completion of the second RRC connection establishment procedure.

18. The method of claim 17, wherein:
the first connection event comprises a mobile terminating (MT) page, and
the second connection event comprises a tracking area update (TAU) for a tracking area change.

19. The method of claim 17, wherein performing the first RRC connection establishment procedure comprises:
transmitting one or more sets of one or more repetitions of random access channel (RACH) preambles, each of the one or more sets of one or more repetitions of the RACH preambles transmitted at a higher transmission power than a previous set of one or more repetitions of the RACH preambles.

20. The method of claim 19, wherein the trigger to initiate the second RRC connection establishment procedure occurs during transmission of the one or more sets of one or more repetitions of the RACH preambles of the first RRC connection establishment procedure.

21. The method of claim 17, wherein detecting the trigger to initiate the second RRC connection establishment procedure comprises a non-access stratum (NAS) layer of the UE detecting the trigger to initiate the second RRC connection establishment procedure.

22. The method of claim 17, wherein performing the first RRC connection establishment procedure comprises an RRC layer and a medium access control (MAC) layer of the UE performing the first RRC connection establishment procedure.

23. A user equipment (UE), comprising:
a memory;
at least one transceiver; and
at least one processor communicatively coupled to the memory and the at least one transceiver, the at least one processor configured to:
perform a first radio resource control (RRC) connection establishment procedure for a first connection event;
detect a trigger to initiate a second RRC connection establishment procedure for a second connection event, wherein the trigger occurs during performance of the first RRC connection establishment procedure;
store a request to perform the second RRC connection establishment procedure in association with the trigger in a buffer until completion of the first RRC connection establishment procedure, such that the second RRC connection establishment procedure is not performed during the performance of the first RRC connection establishment procedure;
ignore, responsive to the first RRC connection establishment procedure completing successfully, the request to perform the second RRC connection establishment procedure; and
perform, responsive to the first RRC connection establishment procedure failing, the second RRC connection establishment procedure based on the request.

24. The UE of claim 23, wherein:
the first connection event comprises a mobile terminating (MT) page, and
the second connection event comprises a periodic tracking area update (TAU).

25. The UE of claim 24, wherein the trigger to initiate the second RRC connection establishment procedure comprises an expiration of a periodic timer associated with the periodic TAU.

26. The UE of claim 23, wherein the at least one processor being configured to perform the first RRC connection establishment procedure comprises the at least one processor being configured to:
cause a communication device of the UE to transmit one or more sets of one or more repetitions of random access channel (RACH) preambles, each of the one or more sets of one or more repetitions of the RACH preambles transmitted at a higher transmission power than a previous set of one or more repetitions of the RACH preambles.

27. The UE of claim 26, wherein the trigger to initiate the second RRC connection establishment procedure occurs during transmission of the one or more sets of one or more repetitions of the RACH preambles of the first RRC connection establishment procedure.

28. The UE of claim 23, wherein the at least one processor being configured to detect the trigger to initiate the second RRC connection establishment procedure comprises a non-access stratum (NAS) layer of the UE implemented by the at least one processor being configured to detect the trigger to initiate the second RRC connection establishment procedure.

29. The UE of claim 23,
wherein the at least one processor being configured to perform the first RRC connection establishment procedure comprises an RRC layer and a medium access control (MAC) layer of the UE implemented by the at least one processor being configured to perform the first RRC connection establishment procedure.

30. The UE of claim 23, wherein the at least one processor being configured to ignore comprises the at least one processor being configured to:
flush the request to perform the second RRC connection establishment procedure from the buffer based on the first RRC connection establishment procedure completing successfully.

31. The UE of claim 23, wherein the at least one processor being configured to perform the second RRC connection establishment procedure comprises the at least one processor being configured to:
retrieve the request to perform the second RRC connection establishment procedure; and
perform the second RRC connection establishment procedure.

32. A user equipment (UE), comprising:
a memory;
at least one transceiver; and
at least one processor communicatively coupled to the memory and the at least one transceiver, the at least one processor configured to:
perform a first radio resource control (RRC) connection establishment procedure for a first connection event;
detect a trigger to initiate a second RRC connection establishment procedure for a second connection event, wherein the trigger occurs during performance of the first RRC connection establishment procedure;
store a request to perform the second RRC connection establishment procedure in a buffer until completion of the first RRC connection establishment procedure;
perform, responsive to the first RRC connection establishment procedure completing successfully a tracking area update (TAU) using an RRC connection established by the first RRC connection establishment procedure; and
responsive to the first RRC connection establishment procedure failing, perform the second RRC connection establishment procedure.

33. The UE of claim 32, wherein:
the first connection event comprises a mobile terminating (MT) page, and
the second connection event comprises a non-periodic tracking area update (TAU).

34. The UE of claim 32, wherein the at least one processor being configured to perform the first RRC connection establishment procedure comprises the at least one processor being configured to:
cause the at least one transceiver to transmit one or more sets of one or more repetitions of random access channel (RACH) preambles, each of the one or more sets of one or more repetitions of the RACH preambles transmitted at a higher transmission power than a previous set of one or more repetitions of the RACH preamble.

35. The UE of claim 34, wherein the trigger to initiate the second RRC connection establishment procedure occurs during transmission of the one or more sets of one or more repetitions of the RACH preambles of the first RRC connection establishment procedure.

36. The UE of claim 32, wherein the at least one processor being configured to detect the trigger to initiate the second RRC connection establishment procedure comprises a non-access stratum (NAS) layer of the UE implemented by the at least one processor being configured to detect the trigger to initiate the second RRC connection establishment procedure.

37. The UE of claim 32, wherein the at least one processor being configured to perform the first RRC connection establishment procedure comprises an RRC layer and a medium access control (MAC) layer of the UE implemented by the at least one processor being configured to perform the first RRC connection establishment procedure.

38. The UE of claim 32, wherein completion of the first RRC connection establishment procedure comprises expiration or stoppage of a connection establishment timer.

39. A user equipment (UE), comprising:
a memory;
at least one transceiver; and
at least one processor communicatively coupled to the memory and the at least one transceiver, the at least one processor configured to:
perform a first radio resource control (RRC) connection establishment procedure for a first connection event;
detect a trigger to initiate a second RRC connection establishment procedure for a second connection event, wherein the trigger occurs during performance of the first RRC connection establishment procedure;
store a request to perform the first RRC connection establishment procedure in a buffer until completion of the second RRC connection establishment procedure;
perform the second RRC connection establishment procedure; and
perform the first RRC connection establishment procedure after completion of the second RRC connection establishment procedure.

40. The UE of claim 39, wherein:
the first connection event comprises a mobile terminating (MT) page, and
the second connection event comprises a tracking area update (TAU) for a tracking area change.

41. The UE of claim 39, wherein the at least one processor being configured to perform the first RRC connection establishment procedure comprises the at least one processor being configured to:
cause a communication device of the UE to transmit one or more sets of one or more repetitions of random access channel (RACH) preambles, each of the one or more sets of one or more repetitions of the RACH preambles transmitted at a higher transmission power than a previous set of one or more repetitions of the RACH preambles.

42. The UE of claim 41, wherein the trigger to initiate the second RRC connection establishment procedure occurs during transmission of the one or more sets of one or more repetitions of the RACH preambles of the first RRC connection establishment procedure.

43. The UE of claim 39, wherein the at least one processor being configured to detect the trigger to initiate the second RRC connection establishment procedure comprises a non-access stratum (NAS) layer of the UE implemented by the at least one processor being configured to detect the trigger to initiate the second RRC connection establishment procedure.

44. The UE of claim 39, wherein the at least one processor being configured to perform the first RRC connection establishment procedure comprises an RRC layer and a medium access control (MAC) layer of the UE implemented by the at least one processor being configured to perform the first RRC connection establishment procedure.

45. A user equipment (UE), comprising:
means for performing a first radio resource control (RRC) connection establishment procedure for a first connection event;
means for detecting a trigger to initiate a second RRC connection establishment procedure for a second connection event, wherein the trigger occurs during performance of the first RRC connection establishment procedure;
means for storing a request to perform the second RRC connection establishment procedure in association with the trigger in a buffer until completion of the first RRC connection establishment procedure, such that the second RRC connection establishment procedure is not performed during the performance of the first RRC connection establishment procedure;
means for ignoring, responsive to the first RRC connection establishment procedure completing successfully, the request to perform the second RRC connection establishment procedure; and
means for performing, responsive to the first RRC connection establishment procedure failing, the second RRC connection establishment procedure based on the request.

46. A user equipment (UE), comprising:
means for performing a first radio resource control (RRC) connection establishment procedure for a first connection event;
means for detecting a trigger to initiate a second RRC connection establishment procedure for a second connection event, wherein the trigger occurs during performance of the first RRC connection establishment procedure;
means for storing a request to perform the second RRC connection establishment procedure in a buffer until completion of the first RRC connection establishment procedure;
means for performing, responsive to the first RRC connection establishment procedure completing successfully, a tracking area update (TAU) using an RRC connection established by the first RRC connection establishment procedure; and
means for performing, responsive to the first RRC connection establishment procedure failing, the second RRC connection establishment procedure.

47. A user equipment (UE), comprising:
means for performing a first radio resource control (RRC) connection establishment procedure for a first connection event;
means for detecting a trigger to initiate a second RRC connection establishment procedure for a second connection event, wherein the trigger occurs during performance of the first RRC connection establishment procedure;
means for storing a request to perform the first RRC connection establishment procedure in a buffer until completion of the second RRC connection establishment procedure;
means for performing the second RRC connection establishment procedure; and
means for performing the first RRC connection establishment procedure after completion of the second RRC connection establishment procedure.

48. A non-transitory computer-readable medium storing computer-executable instructions, the computer-executable instructions comprising:
at least one instruction instructing a user equipment (UE) to perform a first radio resource control (RRC) connection establishment procedure for a first connection event;
at least one instruction instructing the UE to detect, a trigger to initiate a second RRC connection establishment procedure for a second connection event, wherein the trigger occurs during performance of the first RRC connection establishment procedure;
at least one instruction instructing the UE to store a request to perform the second RRC connection establishment procedure in association with the trigger in a buffer until completion of the first RRC connection establishment procedure, such that the second RRC connection establishment procedure is not performed during the performance of the first RRC connection establishment procedure;
at least one instruction instructing the UE to ignore, responsive to the first RRC connection establishment procedure completing successfully, the request to perform the second RRC connection establishment procedure; and
at least one instruction instructing the UE to perform, responsive to the first RRC connection establishment procedure failing, the second RRC connection establishment procedure based on the request.

49. A non-transitory computer-readable medium storing computer-executable instructions, the computer-executable instructions comprising:
at least one instruction instructing a user equipment (UE) to perform a first radio resource control (RRC) connection establishment procedure for a first connection event;
at least one instruction instructing the UE to detect a trigger to initiate a second RRC connection establishment procedure for a second connection event, wherein the trigger occurs during performance of the first RRC connection establishment procedure;
at least one instruction instructing the UE to store a request to perform the second RRC connection establishment procedure in a buffer until completion of the first RRC connection establishment procedure;
at least one instruction instructing the UE to perform, responsive to the first RRC connection establishment procedure completing successfully, a tracking area update (TAU) using an RRC connection established by the first RRC connection establishment procedure; and
at least one instruction instructing the UE to perform, responsive to the first RRC connection establishment procedure failing, the second RRC connection establishment procedure.

50. A non-transitory computer-readable medium storing computer-executable instructions, the computer-executable instructions comprising:
at least one instruction instructing a user equipment (UE) to perform a first radio resource control (RRC) connection establishment procedure for a first connection event;
at least one instruction instructing the UE to detect a trigger to initiate a second RRC connection establishment procedure for a second connection event, wherein the trigger occurs during performance of the first RRC connection establishment procedure;
at least one instruction instructing the UE to store a request to perform the first RRC connection establishment procedure in a buffer until completion of the second RRC connection establishment procedure;
at least one instruction instructing the UE to perform the second RRC connection establishment procedure; and
at least one instruction instructing the UE to perform the first RRC connection establishment procedure after completion of the second RRC connection establishment procedure.

* * * * *